(12) United States Patent
Christenson et al.

(10) Patent No.: US 7,117,246 B2
(45) Date of Patent: Oct. 3, 2006

(54) ELECTRONIC MAIL SYSTEM WITH METHODOLOGY PROVIDING DISTRIBUTED MESSAGE STORE

(75) Inventors: Nikolai Paul Christenson, El Cerrito, CA (US); Scott Ernest Lystig Fritchie, Minneapolis, MN (US); James Stephen Larson, Pleasanton, CA (US)

(73) Assignee: Sendmail, Inc., Emeryville, CA (US)

( * ) Notice: Subject to any disclaimer, the term of this patent is extended or adjusted under 35 U.S.C. 154(b) by 774 days.

(21) Appl. No.: 09/735,130

(22) Filed: Dec. 12, 2000

(65) Prior Publication Data

US 2002/0112008 A1    Aug. 15, 2002

Related U.S. Application Data

(60) Provisional application No. 60/184,212, filed on Feb. 22, 2000.

(51) Int. Cl.
*G06F 15/16* (2006.01)
*G06F 7/00* (2006.01)
*G06F 17/30* (2006.01)

(52) U.S. Cl. ........................... 709/206; 707/10
(58) Field of Classification Search ........ 709/201–253; 707/1–10, 100–104.1, 200–206; 714/1–57, 714/100; 715/752
See application file for complete search history.

(56) References Cited

OTHER PUBLICATIONS

"Babar: An Electronic Mail Database", Putz, Steven, XEROX Corporation—Palo Alto Research Center, Apr. 1988.*
Dierks, T. et al., RFC2246: The TLS Protocol—Version 1.0, Internet Engineering Task Force, Jan. 1999.
Hoffman, P., RFC2487: SMTP Service Extension for Secure SMTP over TLS, Internet Engineering Task Force, Jan. 1999.
Sendmail, Sendmail for NT: User Guide, Sendmail (Part No. DOC-SMN-300-WNT-MAN-0999), 1999.
Crispin, M., RFC2061: IMAP4 Compatibility With IMAP2BIS, Internet Engineering Task Force, Doc. 1996.
Crispin, M., RFC2060: Internet Message Access Protocol—Version 4 (rev 1), Internet Engineering Task Force, Nov. 1996.

(Continued)

*Primary Examiner*—Bunjob Jaroenchonwanit
*Assistant Examiner*—Arrienne Lezak
(74) *Attorney, Agent, or Firm*—John A. Smart

(57) ABSTRACT

An electronic mail system with a methodology providing distributed message storage and processing is described. In particular, this methodology breaks up how the individual components of message data are stored. Message data itself is broken up into two parts: a metadata (mutable) portion, and an immutable portion. The metadata portion represents that part of the message data that may change over time. This includes message status flags (e.g., the IMAP "message deleted" flag) and the message's position within a particular message folder, among other information. The immutable portion, which comprises the bulk of electronic mail data (namely, the message itself), once stored is never edited. Immutable data is written f+1 times on as many unique servers, to tolerate f number of server failures using Lampson's stable storage algorithm. The metadata portion is stored 2f+1 times on as many unique servers to tolerate f number of server failures using quorum voting. Once the message has been stored once, instead of being copied, its location is passed around by reference. The system utilizes a two-tier architecture. One tier consists of servers which store message metadata and immutable data, the Data Servers, and servers that operating upon those data, the Access Servers. Message store integrity is maintained in the event of server failure and as the set of Data Servers changes. In the latter case, I/O and storage workloads are dynamically redistributed across Data Servers in an efficient way.

40 Claims, 11 Drawing Sheets

OTHER PUBLICATIONS

Myers, J., RFC2033: Local Mail Transfer Protocol, Internet Engineering Task Force, Oct. 1996.

Myers, J., RFC1725: Post Office Protocol—Version 3, Internet Engineering Task Force, Nov. 1994.

Braden, R. (EDITOR), RFC1123: Requirements for Internet Hosts—Application and Support, Internet Engineering Task Force, Oct. 1989.

Rose, M., RFC1081: Post Office Protocol—Version 3, Internet Engineering Task Force, Nov. 1988.

Partridge, Craig, RFC974: Mail Routing and the Domain System, Internet Engineering Task Force, Jan. 1986.

Butler, M. et al., RFC937: Post Office Protocol—Version 2, Internet Engineering Task Force, Feb. 1985.

Crocker, David H., RFC822: Standard For The Format Of Arpa Internet Text Messages, Dept. of Electrical Engineering, University of Delaware, Aug. 1982.

Postel, Jonathan B., RFC821: Simple Mail Transfer Protocol, Information Sciences Institute, University of Southern California, Aug. 1982.

* cited by examiner

ELECTRONIC MAIL SYSTEM WITH METHODOLOGY PROVIDING DISTRIBUTED MESSAGE STORE

RELATED APPLICATIONS

The present application claims the benefit of priority from, and is related to, the following commonly-owned U.S. provisional application: application Ser. No. 60/184,212, filed Feb. 22, 2000. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic mail (e-mail) systems and, more particularly, to improved methodology for distributed processing and storage of e-mail messages.

Today, electronic mail or "e-mail" is a pervasive, if not the most predominant, form of electronic communication. FIG. 1 illustrates the basic architecture of a typical electronic mail system 10. At a high level, the system includes a mail server connected over a network to various e-mail "clients," that is, the individual users of the system. More specifically, the system 10 includes one or more clients 11 connected over a network to at least one Message Transfer Agent (MTA) 12a. Communication occurs through a standardized protocol, such as SMTP (Simple Mail Transport Protocol), in the context of the Internet.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® for NT product.)

1. Larry composes the message and chooses Send in Microsoft Outlook Express (a "mail user agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the host providing e-mail service for the destination address. The DNS server, which is a computer connected to the Internet running software that translates domain names, returns the IP address, 127.118.10.3, of the mail server for Martha's domain, example.org.
3. Microsoft Outlook Express opens an SMTP connection to the mail server running sendmail at Martha's ISP. The message is transmitted to the sendmail service using the SMTP protocol.
4. sendmail delivers Larry's message for Martha to the local delivery agent. It appends the message to Martha's mailbox. By default, the message is stored in: C:\Program Files\Sendmail\Spool\martha.
5. Martha has her computer dial into her ISP.
6. Martha chooses Check Mail in Eudora, an MUA.
7. Eudora opens a POP (Post Office Protocol version 3, defined in RFC1725) connection with the POP3 server at Martha's ISP. Eudora downloads Martha's new messages, including the message from Larry.
8. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as the Internet Engineering Task Force's Request For Comment documents (RFCs). Typically, the mail server or MTA must temporarily store incoming and outgoing messages in a queue, the "mail queue", before attempting delivery. Actual queue size is highly dependent on one's system resources and daily volumes.

MTAs, such as the commercially-available Sendmail® MTA, perform three key mail transport functions:

Routes mail across the Internet to a gateway of a different network or "domain" (since many domains can and do exist in a single network)

Relays mail to another MTA (e.g., 12b) on a different subnet within the same network Transfers mail from one host or server to another on the same network subnet To perform these functions, it accepts messages from other MTAs or MUAs, parses addresses to identify recipients and domains, resolves address aliases, fixes addressing problems, copies mail to and from a queue on its hard disk, tries to process long and hard-to-deliver messages, and notifies the sender when a particular task cannot be successfully completed. The MTA does not store messages (apart from its queue) or help users access messages. It relies on other mail system components, such as message delivery agents, message stores, and mail user agents (MUAs), to perform these tasks. These additional components can belong to any number of proprietary or shareware products (e.g., POP or IMAP servers, Microsoft Exchange, IBM Lotus Notes, Netscape, cc:Mail servers, or the like). Because of its central role in the e-mail systems, however, the MTA often serves as the "glue" that makes everything appear to work together seamlessly.

For further description of e-mail systems, see e.g., Sendmail® for NT User Guide, Part Number DOC-SMN-300-WNT-MAN-0999, available from Sendmail, Inc. of Emeryville, Calif., the disclosure of which is hereby incorporated by reference. Further description of the basic architecture and operation of e-mail systems is available in the technical and trade literature; see e.g., the following RFC (Request For Comments) documents:

| RFC821 | Simple Mail Transfer Protocol (SMTP) |
|---|---|
| RFC822 | Standard for the Format of ARPA Internet Text Messages |
| RFC974 | Mail Routing and the Domain System |
| RFC1123 | Requirements for Internet Hosts—Application and Support |
| RFC1321 | The MD5 Message-Digest Algorithm |
| RFC1725 | Post Office Protocol version 3 (POP) |
| RFC2033 | Local Mail Transfer Protocol (LMTP) |
| RFC2045 | Multipurpose Internet Mail Extensions (MIME) Part One: Format of Internet Message Bodies |
| RFC2060 | Internet Message Access Protocol (IMAP), Ver. 4, rev. 1 |
| RFC2086 | Hypertext Transfer Protocol—HTTP/1.1 | currently available via the Internet (e.g., at ftp://ftp.isi.edu/in-notes), the disclosures of which are hereby incorporated by reference. RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards.

Traditional electronic mail (e-mail) systems today are based on monolithic, single-machine configurations, such as a single computer having multiple hard disks. E-mail services are simplest to configure and maintain on a single machine. Such a service, by definition, has a single point of failure. At the same time, however, fairly sophisticated multi-computer hardware is increasingly available. For instance, it is possible to connect together multiple UNIX machines, each running a POP daemon (background process), connected together via a high-speed (e.g., gigabit) network to other computers that, in turn, are connected to disk farms. Despite those advances in computer hardware, there has been little effort today to implement an e-mail system in a distributed fashion—that is, employing a set of machines with a set of disks that cooperate over a network.

Traditional systems have limits in their robustness due to their non-distributed nature. First, traditional systems have difficulty scaling. In a single-machine implementation, scaling the service to meet increased demand involves purchasing faster hardware. This solution has its limits, however. There is usually a strong correlation between e-mail server workload and the importance of 24×7×365 availability. A single server, however large and fast, still presents a single point of failure. At some point on the scalability curve, it becomes impossible or cost-prohibitive to buy a computer capable of handling additional workload. Accordingly, the present-day monolithic systems provide little in the way of scalability or fault tolerance, nor are such systems able to benefit from increased performance afforded by distributed hardware.

As another problem, traditional systems cannot add or remove resources on-the-fly. For single-server environments, additional capacity comes in the form of adding CPUs, RAM, and/or disk resources. Most hardware must be taken out of service during these upgrades, which usually must be done late at night when workloads are light. Eventually, the next upgrade must come in the form of a complete replacement or "forklift upgrade." Adding additional computing resources in a multi-server environment can be much more difficult. As an example, in "active/standby" clusters (usually just a pair of machines), specification of the standby machine is easy: buy a machine just like the "active" one. These pairs have 50% of their equipment standing idle, however, waiting for the "active" server to fail. Some models allow both servers to be active simultaneously: in the event one fails, the other takes over responsibility for both workloads. While resource utilization rates are much higher in such "active/active" schemes, they are much more difficult to plan for. Each machine must now remain at least 50% idle during peak workload; in the event of failure, the surviving machine must have enough resources to handle two machines' worth of work.

Traditional systems also cannot guarantee immediate and consistent data replication. The problem of consistent data replication is so difficult that most commercial systems do not even try to replicate e-mail message data across servers. Instead, most gain their data redundancy via disk storage using either RAID-1 (disk mirroring) or RAID-4/5 (parity-based redundancy). In the event that a server's CPU, memory, disk controller, or other hardware fail, the data on those redundant disks are unavailable until the hardware can be repaired. To overcome this limitation, a small handful of setups may use dual-ported SCSI or Fibre Channel disks shared with a hot-standby machine or use remote database journaling (again for hot-standby mode). However, some industries, particularly where government regulations and industry-standard practices are the main driving forces, have strong requirements for data availability, redundancy, and/or archiving.

Ideally, one could implement an e-mail system in a distributed manner, with resistance against single points of failure. Here, the information stored on any one computer is not instrumental to continue normal operation of the system. Thus, for example, if one of the servers were to fail, the system would continue to function normally despite that failure. Distributed e-mail systems have been slow in coming, due to the difficulty of ensuring efficient, fault-tolerant operation in such systems. Currently, "semi-distributed" implementations exist, though. For example, the Intermail system (by Software.com of Santa Barbara, Calif.) employs a back-end database for storing mail information. Although Intermail employs multiple machines, it is not truly distributed. Instead, the machines are employed more as proxy servers, rather than as control logic for a central message store. With that approach, however, such a system cannot store information redundantly in an efficient manner.

What is needed is a distributed e-mail system that is maximally redundant, yet is resource-efficient. Moreover, such a system should provide fault-tolerant operation, thereby guaranteeing system reliability. The present invention fulfills this and other needs.

SUMMARY OF THE INVENTION

Two basic approaches are available for storing distributed data and making sure that it is consistent when read in the presence of potential fault: (1) stable storage approach, and (2) quorum voting approach. Assuming one can tolerate f number of failures, the first approach is to store f+1 amount (copies) of data. Then, if f failures occur, the (f+1)th copy still remains available. However, a problem exists in that approach. If the data is modifiable, then one does not know for sure whether the copy that is being read has been consistently written (relative to the other copies), unless it is updated atomically (i.e., in a transaction-oriented or "all-or-none" operation). For data that cannot be updated atomically, one solution is to store 2f+1 copies of the data. Then, when data is retrieved from the system, some majority of the available copies are read to derive a consensus of what the data truly are. In effect, the data are subjected to a vote. In this fashion, the approach can determine the consistency of the copies, thereby overcoming inconsistencies caused by partial write operations. Counterbalancing both of these approaches is the desire to read data only once, as it is computationally more expensive, and therefore undesirable, to read data twice (or more times), in addition to writing data twice versus three times.

Using a hybrid combination of the foregoing approaches, the present invention provides a message storage methodology that breaks up how the individual components of message data are stored. More particularly, message data itself is broken up into two parts: (1) a mutable portion, and (2) an immutable portion. The mutable portion represents the parts of the message data that may be edited after the message has been stored. The immutable portion, which comprises the bulk of message data (including the message body), is not edited or modified after storage. Using this division of message information, the following message storage methodology is adopted. The bulk of the message's data is written in large chunks as immutable message data, f+1 times, to tolerate f failures. This is followed by creating mutable pointers which describe the storage location of the immutable message data. Additionally, the mutable metadata includes other information for the message that is subject to change. Message and status flags (e.g., the IMAP message-deleted flag) are examples of editable information that is maintained as metadata. The metadata portion is stored 2f+1 times.

Consider, for instance, a scenario where one wants to guard against a single failure (i.e., f=1). In such a case, the message headers and body (immutable) data for a given e-mail message is written out twice (i.e., f+1 times). Here, the message body data can typically be written out using highly efficient large-block I/O (Input/Output). The corresponding metadata is written out three times (i.e., 2f+1 times) and includes an identifier which describes the location of the message headers and body to which it refers. Actual processing of the e-mail message by the underlying e-mail system occurs by reference, by passing around the corresponding metadata pointers or references that describe where the message data (the immutable portion) is stored. Using this approach, an e-mail system need only write out the message body data f+1 times (e.g., twice for the above example) and then write out the relatively small metadata 2f+1 times (e.g., three times for the above example). For the particular example above, the system is able to avoid writing out the message body data a third time. Message metadata, due to its mutable nature, is stored 2f+1 times in order to make quorum voting possible. However, the size of this metadata is independent of message size. It is smaller, typically by orders of magnitude, than the message's immutable portion.

GLOSSARY

API: Abbreviation for "application program interface," a set of routines, protocols, and tools for building software applications.

BIND: Short for Berkeley Internet Name Domain, a Domain Name Server (DNS). BIND is designed for UNIX systems based on BSD, the version of UNIX developed at the University of California's Berkeley campus.

daemon: A process that runs in the background and performs a specified operation at predefined times or in response to certain events. The term daemon is a UNIX term, though many other operating systems provide support for daemons, though they're sometimes called other names.

DNS: Short for Domain Name System (or Service), an Internet service that translates domain names into IP addresses. Because domain names are alphabetic, they are easier to remember. The Internet, however, is really based on IP addresses. Every time one uses a domain name, therefore, a DNS service must translate the name into the corresponding IP address.

Gigabit Ethernet: The newest version of Ethernet, which supports data transfer rates of 1 Gigabit (1,000 megabits) per second. The first Gigabit Ethernet standard (802.3z) was ratified by the IEEE 802.3 Committee in 1998.

HTTP: Short for HyperText Transfer Protocol, the underlying protocol used by the World Wide Web. HTTP defines how messages are formatted and transmitted, and what actions Web servers and browsers should take in response to various commands.

IMAP: Short for Internet Message Access Protocol, a protocol for retrieving e-mail messages. The latest version, IMAP4, is similar to POP3 but supports some additional features. For example, with IMAP4, a user can search through his or her e-mail messages for keywords while the messages are still on the mail server, and then choose which messages to download to his or her machine. Like POP, IMAP uses SMTP for communication between the e-mail client and server.

inode: A data structure that contain information about files in UNIX file systems, including important information on files such as user and group ownership, access mode (read, write, execute permissions), and type. Each file has an inode and is identified by an inode number (i-number) in the file system where it resides.

"*Law of Large Numbers*": A theorem by Jakob Bernoulli. Stated informally, "In any chance event, when the event happens repeatedly, the statistics will tend to prove the probabilities."

Lock: To make a file or other object inaccessible. File locking, for instance, is a critical component of all multi-user computer systems, including local-area networks. When users share files, the operating system must ensure that two or more users do not attempt to modify the same file simultaneously. It does this by locking the file as soon as the first user opens it. All subsequent users may read the file, but they cannot write to it until the first user is finished.

MD5: An algorithm created by Ronald Rivest that is used to create digital signatures. It is intended for use with 32-bit machines and is safer than the MD4 algorithm. MD5 is a one-way hash function, also called a message digest. When using a one-way hash function, one can compare a calculated message digest against the message digest that is decrypted with a public key to verify that the message has not been tampered with.

MIME: Short for Multipurpose Internet Mail Extensions, a specification for formatting non-ASCII messages so that they can be sent over the Internet. Many e-mail clients now support MIME, which enables them to send and receive graphics, audio, and video files via the Internet mail system. There are many predefined MIME types, such as GIF graphics files and PostScript files.

POP: Short for Post Office Protocol, a protocol used to retrieve e-mail from a mail server. Most e-mail applications (e-mail clients) use the POP protocol, although some can use the newer IMAP (Internet Message Access Protocol). There are two versions of POP. The first, called POP2, became a standard in the mid-1980's and required SMTP to send messages. The newer version, POP3, can be used with or without SMTP.

SMTP: Short for Simple Mail Transfer Protocol, a protocol for sending e-mail messages between servers. Most e-mail systems that send mail over the Internet use SMTP to send messages from one server to another; the messages can then be retrieved with an e-mail client using either POP or IMAP. In addition, SMTP is generally used to send messages from a mail client to a mail server.

DETAILED DESCRIPTION OF A PREFERRED EMBODIMENT

The following description will focus on the presently-preferred embodiment of the present invention, which is implemented in a server-side application operating in an Internet-connected environment running under a network operating system, such as Microsoft® Windows 2000 running on an IBM-compatible PC. The present invention, however, is not limited to any particular one application or any particular environment. Instead, those skilled in the art will find that the system and methods of the present invention may be advantageously embodied on a variety of different platforms, including Linux, BeOS, Solaris, UNIX, NextStep, and the like. Therefore, the description of the exemplary embodiments which follows is for purposes of illustration and not limitation.

Computer-based Implementation

A. Basic System Hardware (e.g., for Desktop and Server Computers)

Figure 1:
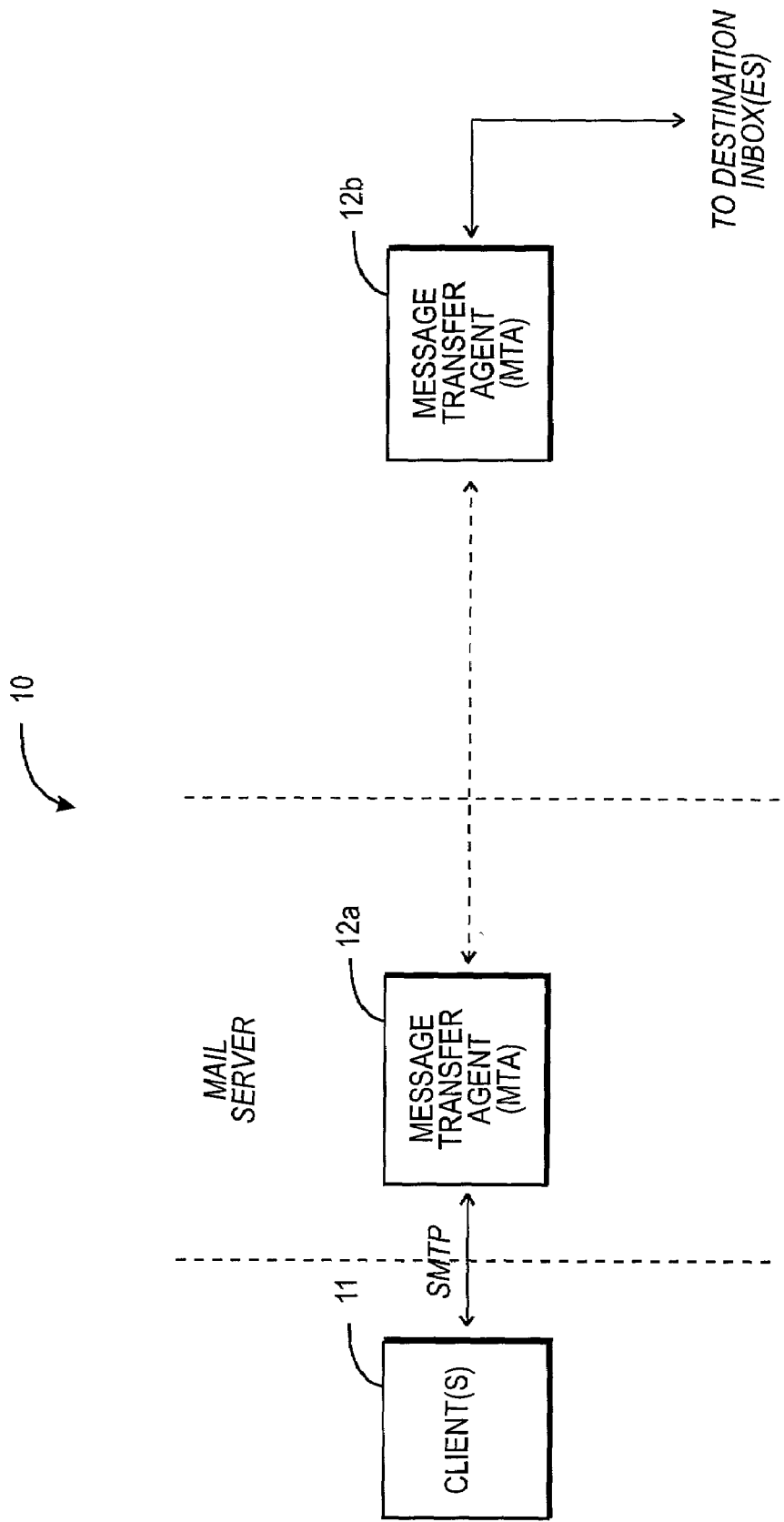
FIG. 1 is a block diagram illustrating the basic architecture of a typical electronic mail system.
Figure 2:
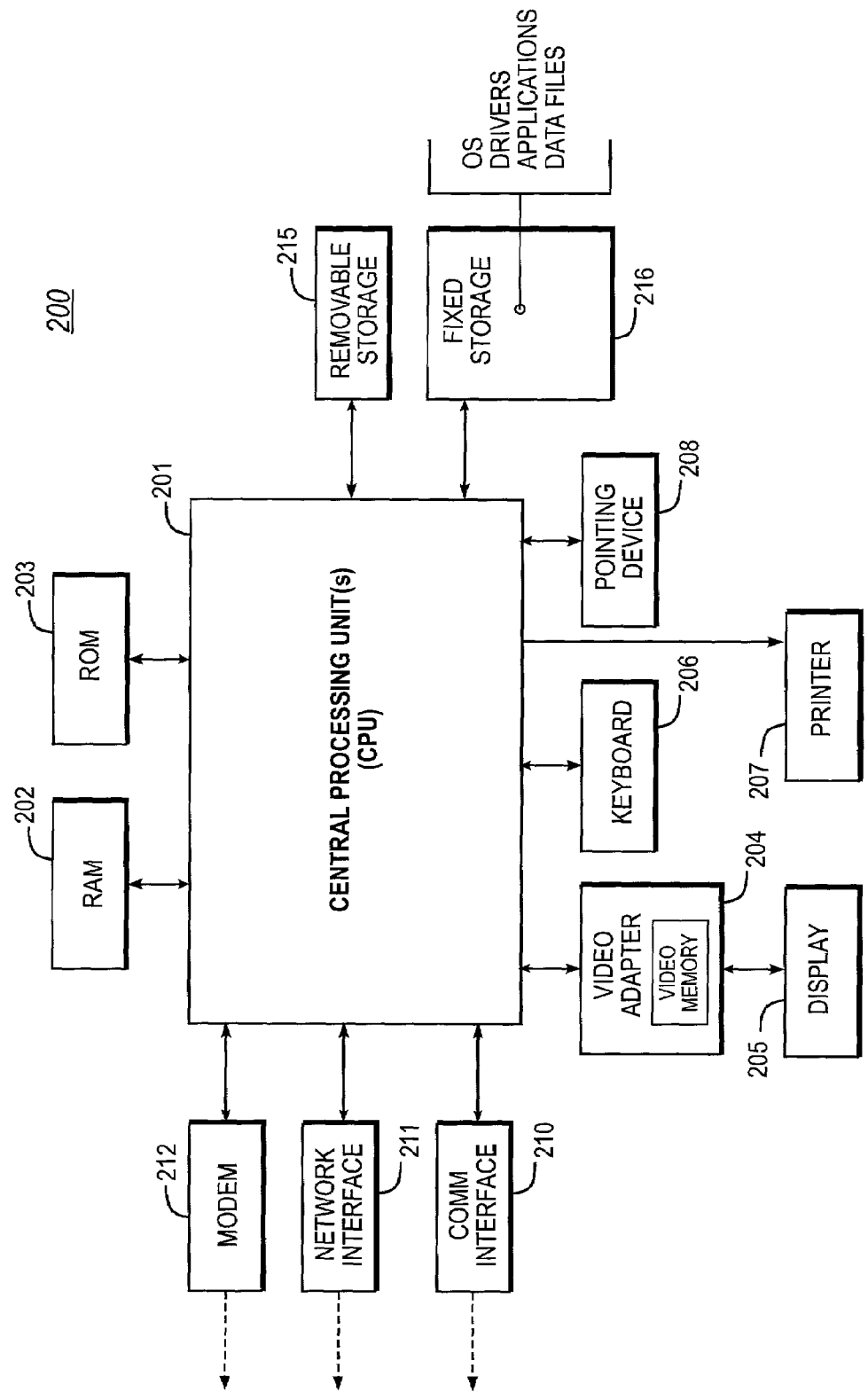
FIG. 2 is a block diagram illustrating a basic computer system suitable for implementing desktop (e.g., e-mail client) and server (e.g., e-mail server) components of the electronic mail system of the present invention.

The present invention may be implemented on a conventional or general-purpose computer system, such as an IBM-compatible personal computer (PC) or server computer. FIG. 2 is a very general block diagram of an IBM-compatible system 200. As shown, system 200 comprises a central processor unit(s) (CPU) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary input/output controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input/output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or mass storage 216 into the main (RAM) memory 202, for execution by the CPU 201. During operation of the program logic, the system 200 accepts user input from a keyboard 206 and pointing device 208, as well as speech-based input from a voice recognition system (not 20 shown). The keyboard 206 permits selection of application programs, entry of keyboard-based input or data, and selection and manipulation of individual data objects displayed on the display device 205. Likewise, the pointing device 208, such as a mouse, track ball, pen device, or the like, permits selection and manipulation of objects on the display device 205. In this manner, these input devices support manual user input for any process running on the system.

The system 200 displays text and/or graphic images and other data on the display device 205. Display device 205 is driven by the video adapter 204, which is interposed between the display device 205 and the system 200. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include an RS-232 serial port, a Universal Serial Bus (USB) interface, or the like. Devices that will be commonly connected locally to the comm interface 210 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun Solaris workstations, which are available from Sun Microsystems of Mountain View, Calif.

The above-described system 200 of FIG. 2 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having services and/or information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 3:
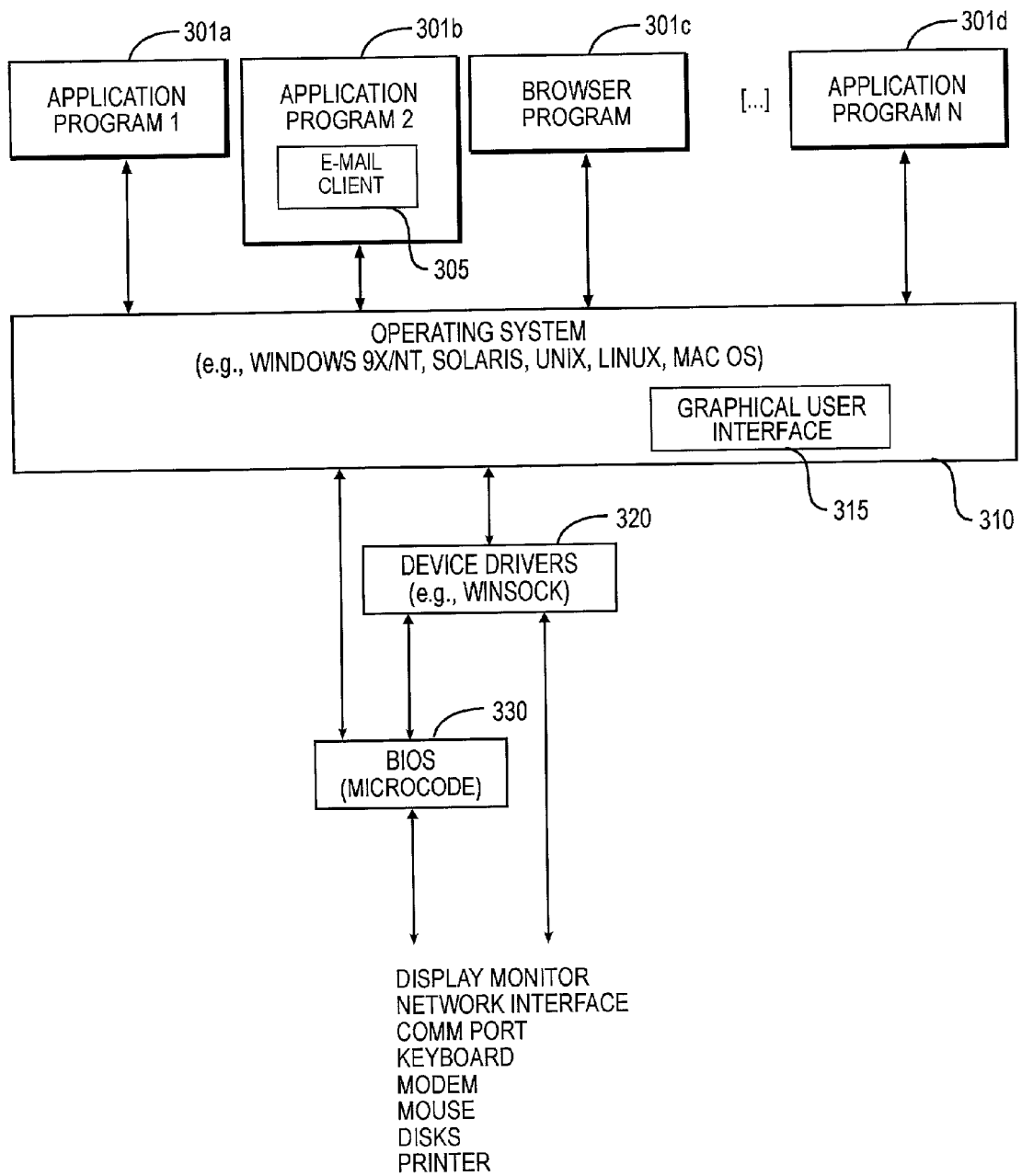
FIG. 3 is a block diagram of a basic software/firmware system suitable for controlling operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301*a*, 301*b*, 301*c*, 301*d*) may be "loaded" (i.e., transferred from fixed storage 216 into memory 202) for execution by the software system 300. For instance, when the system 200 is employed to control a desktop machine, application software 301 includes client e-mail software 305 (e.g., Microsoft Outlook, available from Microsoft Corporation of Redmond, Wash.), as shown. When the system 200 is employed to control a server machine, on the other hand, application software 301 includes mail server software (e.g., Sendmail® for NT).

Software system 300 includes a graphical user interface (GUI) 315, for receiving user commands and data in a graphical (e.g., "point-and-click") fashion. These inputs, in turn, may be acted upon by the system 200 in accordance with instructions from operating system 310 and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 330 (i.e., ROM-based microcode), particularly when interfacing with peripheral devices. OS 310 can be provided by a conventional operating system, such as Microsoft® Windows 9x, by Microsoft® Windows NT, or by Microsoft® Windows 2000, all available from Microsoft Corporation of Redmond, Wash. Alternatively, OS 310 can also be an alternative operating system, such as Sun Solaris available from Sun Microsystems of Palo Alto, Calif., or Linux OS (available from several vendors, including the Red Hat distribution of Linux from Red Hat, Inc. of Durham, N.C.).

Distributed Message Processing and Storage

A. Overall Design Approach

Two basic approaches are available for storing distributed data and making sure that it is consistent when read in the presence of potential fault: (1) stable storage approach, and (2) quorum voting approach. Assuming one can tolerate f number of failures, the first approach is to store f+1 amount (copies) of data. Then, if f failures occur, the (f+1)th copy still remains available. However, a problem exists in that approach. If the data is modifiable, then one does not know for sure whether the copy that is being read has been consistently written (relative to the other copies), unless it is updated atomically (i.e., in a transaction-oriented or "all-or-none" operation). For data that cannot be updated atomically, one solution is to store 2f+1 copies of the data. Then, when data is retrieved from the system, some majority of the available copies are read to derive a consensus of what the data truly are. In effect, the data are subjected to a vote. In this fashion, the approach can determine the consistency of the copies, thereby overcoming inconsistencies caused by partial write operations. In this way, one compromises between the need for absolute data integrity in the face of an arbitrary failure in any single data instance and a minimization of the read/write effort needed to achieve confidence in the data integrity itself.

Using a hybrid combination of the foregoing approaches, the present invention provides a message storage methodology that breaks up how the individual components of message data are stored. More particularly, message data itself is broken up into two parts: (1) a mutable portion, and (2) an immutable portion. The mutable portion represents the parts of the message data that may be edited after the message has been stored. The immutable portion, which comprises the bulk of message data (including the message body), is not edited or modified after storage. Using this division of message information, the following message storage methodology is adopted. The bulk of the message's data is written in large chunks as immutable message data, f+1 times, to tolerate f failures. This is followed by creating mutable pointers which describe the storage location of the immutable message data. Additionally, the mutable metadata includes other information for the message that is subject to change. Message and status flags (e.g., the IMAP message-deleted flag) are examples of editable information that is maintained as metadata. The metadata portion is stored 2f+1 times.

Consider, for instance, a scenario where one wants to guard against a single failure (i.e., f=1). In such a case, the message headers and body (immutable) data for a given e-mail message is written out twice (i.e., f+1 times). Here, the message body data can typically be written out using highly efficient large-block I/O (Input/Output). The corresponding metadata is written out three times (i.e., 2f+1 times) and includes an identifier which describes the location of the message headers and body to which it refers. Actual processing of the e-mail message by the underlying e-mail system occurs by reference, by passing around the corresponding metadata pointers or references that describe where the message data (the immutable portion) is stored. Using this approach, an e-mail system need only write out the message body data f+1 times (e.g., twice for the above example in the message's lifetime) and then write out the relatively small metadata 2f+1 times (e.g., three times for the above example each time the message's state in the appropriate folder is modified). For the particular example above, the system is able to avoid writing out the message body data a third time. Message metadata, due to its mutable nature, is stored 2f+1 times in order to make quorum voting possible. However, the size of this metadata is independent of message size. It is smaller, typically by orders of magnitude, than the message's immutable portion.

B. System Design

1. General

Figure 4:
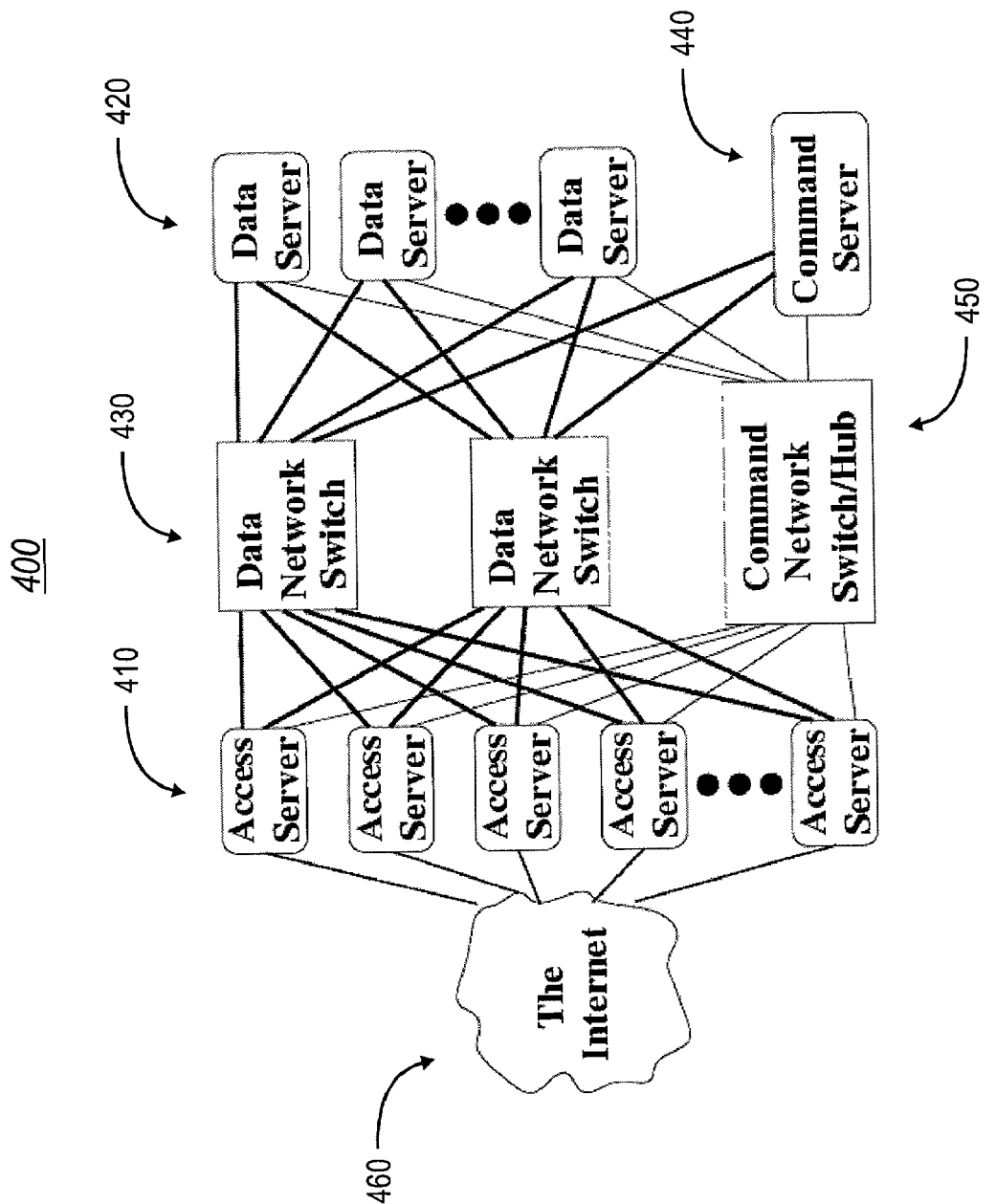
FIG. 4 is a block diagram of a two-tier distributed architecture employed in the preferred embodiment of the present invention.

In a preferred embodiment, a two-tier distributed architecture 400 is adopted, as shown in FIG. 4. Two classes of computing nodes exist in the basic system design: stateless "Access Servers" 410 which speak standard network protocols across the public Internet, and private "Data Servers" 420 which communicate with the Access Servers over an optionally redundant Data Network 430. Additionally, all machines are connected to a Command Server 440 across a non-redundant Command Network (Switch/Hub) 450. The individual components of the architecture 400 will now be described in further detail.

2. Access Servers

The Access Servers 410 are responsible for communicating with clients over the Internet via standard protocols, for example, POP, SMTP, IMAP4, and the like. They are stateless, relying on redundant storage across a set of back-end Data Servers. The Access Servers are exposed to the public Internet, which is shown at 460 in FIG. 4. Here, the Access Servers are multi-homed hosts with at least one network interface on the public Internet. The other components need not be exposed and may not even have publically-routable Internet Protocol (IP) addresses. Interface-based access control is used to limit the services provided on the public network interfaces, as opposed to the Data Network and Command Network interfaces (described later). The Access Servers run service daemons which speak standard protocols, such as SMTP, POP, IMAP, HTTP, or the like. These services are provided by variants of standard daemons, linked with a special library that establishes connections across the Data Network to the Data Servers to store messages. If desired, an Access Server may be specialized to a single service. There are benefits in subdividing Access Servers into specialized roles. For instance, CPU and memory resources can be tailored to each role's own demands. Specialized Access Servers can guarantee, for instance, prompt POP message retrieval services even if SMTP services are under extreme stress.

The Access Servers run programs such as sendmail (i.e., Sendmail, Inc.'s MTA), POP servers, and/or other programs to provide services to clients on the Internet 460 (e.g., HTTP-based servers for sending/receiving e-mail messages with World Wide Web browser software). Each of these programs is linked with a Client Library. The Client Library communicates, via an internal API (Application Programming Interface), with a Client Daemon. The Client Library and API provide a convenient interface between the application processes, which are not aware of the Data Network 430, and the Client Daemon, which is aware of the Data Network and the Data Servers 420. Typically, one Client Daemon runs on each Access Server, though multiple Client Daemons may be run on a single Access Server. The Client Daemon, based on the set of actions to be performed, selects the appropriate Data Servers to communicate with.

Applications communicate with the Client Daemon using an appropriate interprocess communication method (e.g., TCP/IP, shared memory). The Client Daemon communicates via the Data Network to the Data Server. The Data Protocol is used to communicate between the Access Server and a process running on the Data Server called the Server Daemon. The Client Daemon makes decisions about which Data Servers will store the data requested by the applications. The Server Daemon is the process that listens on the Data Network for Client Daemon requests. The Server Daemon interacts with the file system that is built-in to the underlying operating system of the Data Server on which it runs. The file system, which can be any high-quality file system, provides the storage representation for the message store in a preferred embodiment. For the best mode of operation, it is assumed that the Data Server will implement a high performance file system. Examples of suitable file systems include WAFL (by Network Appliance of Sunnyvale, Calif.), XFS (by SGI of Mountain View, Calif.), and VxFS (by Veritas Software Corporation of Mountain View, Calif.).

3. Data Servers

Data Servers (420 of FIG. 4) store messages and their metadata attributes in folders and queues. Messages may be in transit (i.e., queued temporarily by the MTA), stored in the folder of a user's mailbox, or stored permanently for archival purposes. If desired, messages can be stored redundantly to protect against a single Data Server failure, or they may store messages non-redundantly to avoid duplication overhead. The purpose of the message store described in this document is to be optimized for the redundant storage case. The following discussion focuses on the redundant case, which is of particular interest herein. The specifics of the non-redundant case will be implicitly clear to those skilled in the art. In all cases, a single Data Server will only hold one copy of any object which may be replicated on other Data Servers. The Access Servers manage replication across multiple Data Servers. The Data Servers serialize concurrent requests from the various Access Servers.

Data Servers store message, folder, mailbox, and queue data. In addition, file servers can maintain event log data and possibly the authorization/authentication database (if there is no external authentication service). All data are held in files using the underlying operating system's file system(s).

A single Data Server is non-redundant. Replicated copies of data are spread across different Data Servers to protect against failures that cause the loss of an entire Data Server (i.e., a unit of failure). Each Data Server then holds only a single copy of any data item. Indeed, the Data Servers are entirely unaware of the redundancy, if any, being managed by the Access Servers. However, as an optimization, Data Servers may employ RAID techniques individually to increase disk bandwidth and guard against disk failures in order to make each Data Server more reliable. Even when the Data Servers use RAID, multiple copies are still made across different Data Servers to guard against the remaining hardware single points of failure: the Data Server itself and its RAID disk controller(s).

4. Redundant Data Network

In embodiments where the system will be run in a redundant mode of operation, a redundant, high-speed Data Network (e.g., as shown at 430 in FIG. 4) forms the backbone of the system as a whole. In a high-performance system, this typically would include Gigabit Ethernet or other network technology as is appropriate for the individual installation. Two network switches form two independent networks. To avoid a single point of failure either in the network switch, cabling, or the network interface cards, each machine employs two Data Network interface cards, each running to a separate switch. The term Data Network as used herein means either one of the two networks, or both of them together. The protocol used for communication over this network is, in the current implementation, TCP/IP and UDP/IP.

Each Data Server has two network interfaces. Here, each network interface has a separate IP address on each Data Network; IP aliasing or other methods are not used to make the interfaces appear identical at ISO network model layer three. The Client Daemons on the Access Servers know both IP addresses for each Data Server. In the event of a failure of one network, each Client Daemon attempts to reestablish connections over the other network.

While there are two high speed network interfaces on each server attached to separate physical and logical networks, there is only one Command Network. If the Command Server cannot communicate with Access and Data Servers over this network, it will fall back to using one of the Data Networks to communicate with the server while the Data Network may be used for passing administrative traffic if the Command Network is down, the Command Network is not used for passing e-mail message traffic, even if both Data Networks are unavailable.

5. Command Server

The Command Server (440 of FIG. 4) is the main administrative machine, connecting to all other machines through the Command Network as well as the Data Network. It has no direct operational role, so it need not be redundant. If desired, however, it may be implemented as two clustered workstations, e.g., as a traditional active/standby pair.

The Command Server is the focal point of monitoring, command, and control. All other machines listen to the Command Server for configuration data and commands to change operational modes. All machines report operational statistics to the Command Server.

The Command Server is not critical for nominal operations. The Command Server has no operational role—none of the other machines ever depend on input from the Command Server. The system can operate, even tolerate faults, without it. Therefore, the Command Server does not have to be redundant, though it may be implemented as a cluster, if desired. This simplifies the overall system design since redundancy need not be implemented through the command protocols.

An independent Command Network (450 of FIG. 4) connects to all servers. Although the Command Server is connected to the Data Network, it nominally issues all of its commands over a separate, low-speed, non-redundant Command Network. The purpose of the Command Network is to provide guaranteed bandwidth to the Command Server for its administrative tasks. Even if the Data Network is overloaded with data, the Command Server can promptly monitor the load and take necessary corrective actions.

6. Advantages of Architecture

The two-tiered architectural design meets several important design criteria for security, performance, and reliability. First, the network design limits which machines are exposed to the public Internet. Only the Access Servers are exposed to the public Internet, and they should be configured accordingly. The Access Servers do not trust any machine outside of the cluster. The Data Servers are not connected to the public Internet and, therefore, are not subject to many types of attacks since packets from the public Internet cannot reach them.

In this two-tiered architecture, the amount of computing resources applied to applications handling customer requests and storing data can be varied independently. In contrast to other prior art systems, the system's two-tiered architecture allows the system to better adapt to its environment. For example, a corporate e-mail server using IMAP would have more persistent storage per capita than an ISP using POP. Accordingly, the system's cluster for the corporate customer can have a greater ratio of Data Servers to Access Servers, or perhaps Data Servers with a greater amount of disk space. A cluster can be changed on-the-fly by adding or dropping machines of one tier or another or by adding additional disk space to one or more Data Servers. By contrast, changing these aspects in a conventional system may require reconfiguring or replacing each of the single-tier machines.

C. Redundancy Approaches

1. Replication: Quorum Voting

"Quorum voting" guarantees fault-tolerance properties, which can establish a correct result even in the event of any single-unit failure. Writing 2f+1 copies tolerates f failures. In the nominal case, quorum voting requires that any datum be written, in its entirety, on a set of machines. A successful read must read the same data from more than half of that same set of machines.

This arrangement provides the ability to tolerate f failures with 2f+1 machines. Nominally, one employs triple-redundancy for single-failure tolerance. This approach can scale down to a single copy, which is not fault-tolerant, or scale up to five-way replication to tolerate two simultaneous faults, and so on. Note that, in the currently-preferred embodiment, this fault tolerance approach is employed for the Data Servers only.

Repair is possible when damage is detected. If, at any time, a failure occurs on one node, there will still be enough operational nodes to form a quorum. However, the failed node may later re-enter service with a data set that is different than the others. Once a failed Data Server has returned to service, a redundant read operation that retrieves data from multiple Data Servers may return conflicting answers. Therefore, in accordance with quorum voting, enough extra reads are performed from remaining Data Servers storing the same data element to gain a majority view. When the difference is noticed, it can be repaired by replacing the data on the (formerly) failed node with the consensus of the quorum. It is important to use a concurrency mechanism, such as a "lock," to exclude writes to other copies of the datum while the repair is in progress. The same mechanism can also be used to populate a new file server with data, as described below.

Some recovery is possible in a worst-case failure. In the event of a failure so extensive that there are not enough functional servers to make a quorum, or if the operational servers contain data so divergent such that consensus is not possible, it still might be possible to salvage some of the data. By making conservative assumptions to preserve data, it may be possible to reconstruct a badly-degraded mailbox as the union of whatever messages may be held on any of the file servers. This may cause previously-expunged messages to reappear, but this is preferable to losing data. Regarding attributes of the messages at this point, the most conservative option is to mark them with the attributes of newly-arrived messages, thus encouraging users to take a look at them. This is the currently-preferred method employed.

2. Concurrency: Local Lock Quorums and Voting

A large, distributed e-mail system may have thousands of data operations proceeding in parallel upon different message delivery queues and mailbox folders. Most of these operations do not operate on the same objects simultaneously, but this behavior is not guaranteed. There must be a way to control concurrent operations on any queue, queue item, mailbox, folder, or message. Locks, or more properly, locks with time limits (also known as "leases"), provide this control.

"Quorum locking" establishes a global consensus through local locks. A "local lock" is one granted by an individual Data Server, which enforces the lock without coordination with any other server. On occasion, multiple independent processes may want to lock the same global object at the same time. A "global lock" is a series of local locks taken with separate protocol operations to different Data Servers until a majority of possible local locks is held. The various operations described later may require either kind of lock. Just as a majority share establishes a fault-tolerant consensus for the data stored on the Data Servers using Quorum voting, taking a majority of individual locks on the file servers establishes a global lock. It is impossible for more than one Access Server to hold a majority of locks. If two Access Servers simultaneously attempt to grab a global lock, the one which cannot grab a majority will relinquish its locks to the victor. Once a process obtains a majority of local locks for a datum and thus obtains a global lock for the datum, that process may create, modify, or delete any copy of the datum, regardless of whether that copy is protected by a local lock.

Lock ordering and exponential back-off avoids deadlock. There is a danger of two or more Access Servers getting into a situation where each of them has grabbed enough locks so that no one can attain a majority. The traditional solution to this "dining philosophers" problem is to establish an order in which locks must be taken. This reduces the problem to a race for the first lock, which is resolved locally. In the first pass, the problem is solved in the same way. Any set of Access Servers attempting to globally lock the same datum will attempt to grab the necessary locks in the same order to minimize the possibility of lock contention. Of course, one is faced with the complication that different Access Servers may have different opinions of which file servers are available, so one Access Server may think that the first lock in the locking order is unavailable, and then will attempt to grab the second lock. The resulting race for the remaining locks could end with neither getting a majority. This condition is handled by the following approach:

(1) An attempt to grab a local lock will either succeed or fail because the lock is already taken.
(2) If, before a majority is taken, an Access Server fails to take a lock, it will then quickly scan the remaining locks to see if they are taken. If it detects that it cannot obtain a majority, it releases its locks taken so far and waits for a short, random time period.
(3) After a majority is taken, an Access Server will attempt to take one more, for fault tolerance. In its attempts to attain majority-plus-one, it will make a single retry after a failure or expiration. After it attains majority-plus-one, it will try to take the remaining locks, but will not re-attempt after failures or expirations.
(4) On successive retries, the random range of the waiting period grows progressively longer.

The Access Server will attempt to take all of the locks if possible. However, if one of the Data Servers does not reply promptly to lock requests, the Access Server may be forced to wait for it. Since the Access Server may be holding some locks already, it will then block other Access Servers waiting for those locks, causing a cascading bottleneck. Therefore, lock timeouts should be as short as possible. Additionally, one may dynamically monitor network latency conditions so that timeouts can be set according to observed response times rather than anticipated worst-case estimates, which may either be too long or too short. With this scheme, a deadlock situation is unlikely to originate, and if it does, the random waits, exponential back-off, and retries, will eventually resolve itself.

3. Determining Replica Locations

In order for the quorum voting system to work correctly, all Access Servers must agree which set of Data Servers hold replicas of a particular datum. This set is referred to as the location set for the datum.

A mapping algorithm eliminates the need for a directory service. One way to map entity names to location sets is to maintain a name server running on a separate machine. This centralizes the administration and control of the mapping but introduces a single point of failure.

Instead of a directory service, the invention uses a hashing algorithm to determine an object's location set. For an entity name, one computes a hash value h, say, using MD5. A location set of size m out of n Data Servers can then be determined by a formula, such as $\{h \bmod n, (h+1) \bmod n, \ldots, (h+m-1) \bmod n\}$. This hashing algorithm eliminates the need to maintain a list of all queues or mailboxes or even to keep statistics on their distribution. Even a relatively simplistic hashing function will serve to spread the objects evenly enough across all of the Data Servers.

A global "View" is controlled by the Command Server. The only global state that needs to be controlled is the number of Data Servers used as the modulus n in the hashing formula above. If different Access Servers have different values of n, they will inconsistently lock, read, and update the replicas. Therefore, the value of this number is distributed by the Command Server. Changing the value of this number involves a two-phase protocol, which is described below. The list of all operational Data Servers, as decreed by the Command Server, represents the View.

4. Reconciliation of Data

The system is robust against a failure to store a replica of a datum, whether from a momentary outage of a network component, temporary failure of a process on the Data Server, or even a complete crash of a Data Server. In any of these cases, the data stored on the failed machine can drift out of sync with the others. Though the system can function indefinitely without correcting the problem, it cannot tolerate another fault without risking data loss. It is important, therefore, that the damage be repaired. "Reconciliation" is the process of restoring the state of data on a failed server to its original, fault-tolerant state.

Data can and should preferably be refreshed on-the-fly. Access Servers performing read operations can notice inconsistencies in replicated data via the quorum voting algorithm. Normally, two reads are made out of the three replicas. If there is an inconsistency between the data returned, then a third read is used to establish a majority. The minority data may then be corrected on-the-fly. The correcting write is not a critical operation: if it fails, the system is no worse off than before. Therefore, there is no reason to make the initial request wait for this reconciliation attempt to complete. Quorum writes always reestablish consistency, since they will overwrite inconsistent data.

If there is reason to suspect that a Data Server may contain inconsistent data, then the Access Servers can be asked to always include that machine in their two-out-of-three choice for reads, so that it is brought in step with the quorum more quickly. On the other hand, to avoid overwhelming a new machine, they can also be instructed to tend to avoid the same server. A dynamic load-balancing scheme can vary between these alternatives to ensure that inconsistencies are discovered as quickly as possible but without impacting the quality of service. Optionally, a weighting scheme could be passed by the Command Server to each Access Server and updated on a regular basis.

The most extreme case of reconciliation is when the data content of a Data Server is completely lost, whether through disk failure or complete machine failure. In this case, every read on the replacement machine will be inconsistent, not just on those data items updated during the outage.

In order to update a particular Data Server, it is tempting to import data from other Data Servers in order to update the particular Data Server as much as possible before placing it into service. However, since it is undesirable to halt service while the data is being transferred, there will be concurrent transactions on the live Data Servers during the update. As a result, the data copied over potentially will become stale as soon as it is written to the new disk, and becomes staler with each passing moment. Unless some kind of snapshot is made or synchronization steps taken, one also runs the risk of a copy being made from a moving target, which may result in the copied image not even being well-formed as a data set. The copied image may then be repaired by a second offline update pass on the data, but transactions still continue. After some time, the data may be close enough to risk a limited interruption in service to fully get caught up and resume with the new data.

However, it is also possible to place the new machine into service with no warmup, begin to fill in data on-demand as transactions happen, using load-balancing to avoid overloading the new machine, and start a background process to update all data that is touched on-the-fly. Since this scheme does no unnecessary work and only uses mechanisms which have to be developed for other purposes as well, it is the preferred reconciliation method.

A background sweeper ensures that all data are eventually repaired. In addition to repairing data on-demand, the Command Server can ask one or more Access Servers to actively check for corruption of data by progressively scanning all data on the Data Servers and ensuring consistency among their replicas. Such a scan can run at a low priority to ensure that it does not degrade the performance of the system. During busy times, it may be shut off entirely until capacity is available to run without negatively impacting service. For reconciliation of a particular Data Server, a sweep can be modified so that it only checks consistency of data that have at least one replica on the Data Server in question. Once this sweep is done, fault tolerance has been restored.

The sweeper process can save network bandwidth, at the expense of a negligible risk, by asking the Data Servers to compute checksums or hashes of data instead of transmitting the actual data. The hash or checksum must be based upon a standard presentation of the data, so care must be taken if an upgraded Data Server uses a new low-level file format to hold the data. The hash value should be large enough to make hash collisions very unlikely, given the volume of data on the system.

5. Migration of Data

The migration of data involves the rebalancing of data once a new Data Server has been added to the system (not merely replacing a failed server) or when a Data Server is removed permanently. This changes the distribution of the replicas of data. The challenge is to keep the system fault-tolerant while data is migrated from old to new locations.

As with reconciliation, data migration should happen on-the-fly to ensure consistency, maintain fault tolerance, and avoid an interruption of service. Again, as with reconciliation, one establishes a way for the migration to happen while still satisfying current requests. Data migration happens "on demand", that is, as data elements are accessed through normal use they are migrated as they are accessed. At the same time or after some time has passed, a "sweeper" process is started which migrates non-accessed data. Finally, after all the data is suspected to have been migrated, a consistency checker is run to be sure that this is the case, at which point the migration is finished.

Migration is completed in two phases. This two-phase migration establishes a "before" and "after" location set for each data item. This is established by the Data Server, and this information is pushed to each Access Server. Since the Access Servers do not communicate among themselves, at any one time it is possible for each Access Server to perceive a different set of Data Servers as currently being accessible via the Data Network(s). Further, there is no way to assure that all Access Servers receive the information about the changed set of Data Servers simultaneously, hence the need for a multi-phase protocol.

In Phase 1 of this protocol, each Access Server is updated about the "before" and "after" location sets of each data. Of course, a list of these locations is not provided, but two hashing algorithms are provided to act on each data element such that one can determine on which Data Server they are supposed to reside in each location set. During migration, data modification takes place in the following way: First, the Access Server obtains a lock in the "after" location, then it obtains a lock in the "before" location. After both locks have been obtained, the Access Server checks for data existence in the "after" location. If it does not find it there, then the data item is updated in the old location only.

In Phase 2, it is now only necessary to obtain locks in the "after" locations. Any data found in the "after" location will be updated in place. Any data found in the "before" location will be moved to the "after" location. Note that under this scheme, a lock is placed on a data item in the "after" location whether it exists there or not.

If in Phase 1 an Access Server discovers that data has moved to its "after" location (by checking there after it has locked the data, but before it performs an update in the "before" location), then it immediately proceeds to Phase 2.

Since the Command Server establishes the transition from one phase of the migration to another, it can make sure that no two Access Servers have an incompatible view of the system. The Command Server will inform each Access Server that it should now be in Phase 1, but it will not give the go-ahead to transition to Phase 2 until each Access Server has acknowledged that it is operating in Phase 1. Once it has received this notification, the Command Server will give instructions to transition to Phase 2. At any time after the Access Servers have responded that they are in Phase 2, the Command Server may instruct an Access Server to begin forcibly locking and migrating all unaccessed data from the "before" to "after" locations. Once this has been accomplished, the Command Server will instruct an Access Server to sweep over all the data to make sure everything has been migrated. Once this has been determined to be the case, all the Access Servers can be informed that the "before" View is no longer relevant.

At any time, some Access Servers may be in one phase while others are in an immediately-preceding or following phase without damage to the data integrity of the system. However, it cannot be the case that some Access Servers are in each of four different states, pre-Phase 1, Phase 1, Phase 2, post-Phase 2. Since the Command Server controls the state change, it can make certain that this does not occur before every Access Server is ready.

During migration, all operations must satisfy the redundancy requirements of both Views during Phase 2. Because of the quorum algorithm, a single fault can be tolerated during this period, even if the replica sets of the two Views overlap. Note that it is possible for the replica locations of the "before" and "after" Views to partially or totally overlap, even certain if the number of Data Servers is small or Consistent Hashing is used to determine the two Views. In this case, replicas on the overlapping Data Servers need not be moved at all. This is a desirable property.

During migration, the two Views are not symmetric—the "after" View must be regarded as a tentative View that one is trying to establish, and certain kinds of errors in it should be corrected without triggering any warnings. For example, when data are referenced for the first time during Phase 2, all read attempts in the "after" View will fail.

Reconciliation may also occur during a migration. There are no problems with handling the on-the-fly repair aspects of reconciliation during a migration. The usual reconciliation algorithm repairs data in both the new and the old Views. The only complication is the need to run a sweep of the entire data set both for reconciliation and migration safety.

D. Immutable Messages

1. Stable Storage

"Stable storage" is a way to store immutable data and tolerate f faults with f+1 redundancy. For an introduction to stable storage, see e.g., Lampson, B. W., *Ethernet, pup and violet, Distributed systems: Architecture and Implementation*, No. 105, Lecture Notes in Computer Science, pages 265–273, Berlin: Springer-Verlag, 1981, the disclosure of which is hereby incorporated by reference. The basic approach is to store f+1 copies of the data and read any available copy. The data may never be modified, therefore any of the copies will be up-to-date and correct. This approach presumes that an attempt to retrieve a copy from a failed server may generate an error or may not return at all (i.e., server timeout) but will never return incorrect data. To protect against data corruption, the data may be augmented with a checksum if it is not provided by the underlying media. Although it is easy to incorporate such a checksum, the design presented below assumes that it is not present.

It is important that failures during initialization of stable storage do not result in the creation of incomplete copies of the data, lest a later read operation encounter this incomplete object. Since only one read request is issued, the discrepancy with other data may never be noticed. This problem can be avoided by any of several techniques.

If the Data Servers are storing stable storage data in files in its underlying file system(s), there are two options. If that file system supports an atomic file creation operation, the problem is taken care of already. If not, the file can be written using a temporary file name, then renamed to its permanent file name: the semantics of the UNIX file rename( ) system call provide the required atomicity. Temporary file names use a well-known naming convention, e.g., a ".tmp" suffix, to clearly identify their temporary nature. Any temporary file last modified more than a few hours ago is clearly the leftover of a failed or interrupted stable storage file creation attempt and can be removed with impunity.

If the Data Servers are implemented using a DBMS (database management system) or using some other method which provides transaction-oriented semantics, then the Data Servers can rely on that mechanism to implement stable storage.

The stable storage files are named with an identifier, or a handle, which can be input to the hashing algorithm to return a set of Data Servers. For a single-failure tolerant, one only needs f+1=2 Data Servers to reliably store the data. However, in order to ensure that one can store the data with fault-tolerant redundancy even if a Data Server is temporarily unavailable, a set of 2f+1=3 Data Servers is instead employed, choosing f+1 out of that set to actually store the replicas. Therefore, even if one Data Server is down, every new message that enters the system will still be stored twice.

For a reliable read of stable storage, the entity name is consistently hashed to get a set of 2f+1 Data Servers. One of these Data Servers is chosen arbitrarily (for this invention the best mode is sequentially), and a read attempt is made. If the stable storage datum is not available on that Data Server, the others in the set are tried one-by-one until the datum is found. If the data are found on any of the servers, the information read will be correct, because the system would not have created a reference to a data instance if it did not know that that data instance was completely intact. If the data are not found on any of the servers, then more failures have occurred than the cluster's fault-tolerant configuration can handle.

2. Message Anatomy, Queueing, and Delivery

Data is placed into stable storage only when it can no longer change. In a sendmail system, once an SMTP message is successfully queued, its body will never again be modified. There are cases where the MTA may be configured to perform data format conversions of the message body, e.g., 7-bit- to 8-bit-significant format or Quoted-Printable (RFC2045, section 6.7) to 8-bit-significant format. In these cases, the data is converted before commitment to stable storage. If another conversion is required later, the conversion is done after the data is read from stable storage. In no case is the data rewritten after commitment to stable storage.

Headers, however, are not delivered as they are received. Most message headers are stored in stable storage. Those headers which require modification after commitment to stable storage are constructed dynamically from that message's metadata. By providing ways for these processes to persistently store their metadata via other means, one can treat message headers as immutable once the message is written into some mailbox but not as it sits in the queue.

3. Reference Counting

A message header or body can be arbitrarily shared through delivery to multiple recipients or IMAP COPY operations. The system needs to be able to delete a stable storage object once, and only when all references to it have been deleted. There are two general approaches to storage reclamation of this sort: garbage collection and reference counting. In a system with more complicated references between objects, garbage collection has some compelling advantages. Modem garbage collectors can be real-time, distributed, cache-conscious, and very efficient. However, such collectors are complex, especially considering the large scale, fault-tolerant environments that this e-mail system will be deployed in. A general-purpose garbage collector would be overkill in such an environment.

Instead, in the currently-preferred embodiment, reference counting is used to reclaim stable storage. Associated with each stable storage item is a count of the number of queue or folder references to it. The count starts at one when the stable storage object is created. When the count reaches zero, the storage space used by the object is reclaimed safely, since there are no references to the object, and no new references can be created.

Since the stable storage object and the reference(s) to it will, in general, be on different Data Servers, one has an atomicity problem with manipulating the reference count:

one cannot create or delete the message reference and modify the reference count simultaneously. Even a two-phase commit protocol cannot prevent this, as one is not guaranteed that crashed nodes will eventually restart. One is either faced with the anomaly of the reference count being too high, which can cause a storage leak, or the reference count being too low, which can cause dangling pointers. Because dangling pointers cause data loss, storage leaks are a lesser problem to the system (as long as there is some way of correcting them). Therefore, the reference count operations are ordered such that failures will never leave a dangling pointer.

There are two methods of validating reference counts to detect storage leaks: scanning all references and recomputing the counts, or keeping backreferences from the stable storage to all references for it. Scanning all references and recomputing the reference counts is tantamount to garbage collection and is subject to the problems of scale and fault tolerance identified above. As long as the number of references to a stable storage object are kept to a reasonable number, backreferences represent the currently-preferred approach. If a stable storage object would require too many references (and thus also backreferences) to be "reasonable", another copy of that object is made, and the references are split between the copies. For example, if a single message is delivered to 10,000 local recipients, but the implementation can only handle 4,096 references per stable storage object, then each of the message's stable storage objects can be copied twice, and the 10,000 references can be divided evenly among each of the three copies of each object.

4. Reconciliation of Stable Storage Errors

The failure of a Data Server may cause the number of replicas of any given stable storage object to drop below the f+1 copy threshold. Discovery and repair of these errors is straightforward.

When the system attempts to retrieve a copy of a stable storage object, the object's location set of 2f+1 Data Servers is first determined. A Data Server is chosen from that location set in an attempt to retrieve the object. Each set is tried in any order, typically sequentially in the absence of any specific reasons (e.g., loading or availability) that a particular Data Server should be skipped. Once the object is found and acted upon, it is not necessary to contact any other Data Servers.

The reconciliation algorithm, due to the immutable nature of stable storage objects, is simple: continue searching the object's location set until a copy of the object is found. Then create copies of that object on surviving Data Servers, atomically, in the location set until the number of available copies rises to f+1. If a failed Data Server later returns back into service, then more than f+1 copies of the object will be available, but because all copies of a stable storage object are by definition immutable, the message store remains consistent. If desired the extraneous copies can be safely deleted by periodic sweeper processes, but that does not affect the running system.

E. Data Storage and Data Structures

1. Single-Instance Message Store

The system implements what is commonly called a "single-instance message store". In a mail server using a more traditional mailbox format (such as the UNIX mailbox format) for message storage, a message with several local recipients will be stored several different times, once per recipient. While easy to implement, this replication consumes a fair amount of unnecessary disk space. MIME attachments of multi-megabyte files are becoming increasingly common. Even though disk space is relatively cheap today, system managers prefer not to spend money on disk storage when the multiple message copies do not increase fault tolerance. Thus, in accordance with the present invention, the system writes the contents of each message only once (not including copies made for redundancy's sake); pointers to the message text location are inserted in each recipient's mailbox. The chief reason for implementing this in the system is not for the space it saves but reducing the I/O bandwith required to deliver messages. A single-instance message store facilitates this by writing message bodies to disk only once.

2. Extensive Metadata Use

The system stores messages with a model similar to a UNIX file system. The headers and body of a message are stored on the Data Servers in files; these files act like UNIX file system "inodes" and their associated storage blocks. Metadata files, one per mail folder, contain the references which describe where each message data file is located, and thus resemble UNIX file system directory files. As with UNIX inodes, the header files and body files use link reference counts in order to determine when the storage space they occupy can be deallocated.

The analogy falls short when considering the backreference information in stable storage object. UNIX file systems do not include backreference information in the inode. UNIX file system consistency checking programs (usually called "fsck") instead scan all forward references in directories and recomputes all reference counts. This method, as mentioned earlier, is impractical for a distributed system of this scale; thus backreferences are used.

3. Consistent Hashing

Consistent hashing is an algorithm that permits expansion or contraction of the Data Server pool while migrating a minimal number of mailboxes, queues, and messages. It is described in Kanger, Lehman, Leighton, Levine, Lewin, and Panigrahy, *Consistent Hashing and Random Trees: Distributed Caching Protocols for Relieving Hot Spots on the World Wide Web,* Massachusetts Institute of Technology, 1997, the disclosure of which is hereby incorporated by reference.

Consistent hashing maps data objects (e.g., strings) to a finite set of buckets. Unlike other hashing algorithms, when a new bucket is added to the pool, consistent hashing will only occasionally map an object from an old bucket into the new bucket. It will never remap an object from one old bucket to another old bucket.

The algorithm consists of two stages. In the first stage, the data objects are mapped onto the half-closed [0,1) unit interval. Any conventional hashing function may be used, but it must provide a very uniform distribution across its range. In the second stage, buckets are mapped onto sets of points on the unit interval. The hash of an object is mapped to the nearest bucket on the unit interval (wrapping around at the ends of the interval).

As buckets are added to the hashing scheme, the points they map to on the unit interval become the nearest bucket for some objects. For the majority of objects, an old bucket point is closer and remains the closer. Therefore, the majority of objects will continue to map to their old buckets. Similarly, when a bucket is removed there is a minimum of disturbance.

Assuming a uniform distribution of objects on the unit interval, the uniformity of the bucket mapping depends on how uniformly the buckets are mapped onto [0,1). Ideally, each bucket's "catch basin" on the unit interval will have equal area. A reasonable way to do this is to choose an upper limit B on the number of buckets and have each bucket map onto log(B) random, pseudorandom, or evenly-spaced points on [0,1).

The invention requires a slight variation of the algorithm: it uses consistent hashing to choose the 2f+1 Data Servers to store replicated metadata objects and f+1 Data Servers to store stable storage objects. This is done by choosing the closest 2f+1 buckets (or f+1 buckets) to the object's hash, computed with a hashing algorithm, such as MD5. Each bucket is assigned a Data Server. If two buckets, which are nearest an object's hash value, are assigned to the same Data Server, one bucket is ignored and the next closest bucket is chosen. This process repeats until 2f+1 (or f+1) unique Data Servers have been selected.

This algorithm ensures minimum disruption of the bucket set as buckets are added or deleted. For any object hash, the bucket set changes by, at most, the number of buckets added. If a conservative approach is taken, and only a single Data Server is added or removed each time, the bucket set can change by, at most, one bucket. Therefore, at most, only one copy of a redundantly-stored object must be moved in a Data Migration.

4. Access Servers Determine Which Data Servers Store Objects

The Access Servers determine where all files are stored. They use handles, or opaque objects of fixed size, to determine which Data Servers may store copies of any given data object. Handles are generated by one of two methods, depending on the type of object. The Command Server distributes the cluster's current View, which includes bucket-to-interval and bucket-to-Data Server mappings for use with the Consistent Hashing Algorithm, to each Access Server.

Given an object's handle, the Access Server uses the Consistent Hashing Algorithm to determine the set of Data Servers which may store the object. Given an object's handle and a small amount of additional information about the object (to assist with handle collisions), a Data Server can then uniquely locate that object within its file system(s) or determine that the object does not exist.

A situation which cannot occur in a UNIX file system but can occur in a system cluster is an attempt to allocate the same inode. A UNIX file system keeps paranoid control over inode allocation. The distributed nature of a cluster in the system of the present invention makes such control difficult. It is possible for a newly-generated handle to collide with a previously-written file or, worse yet, be used in a race (probably with another Access Server) with the creation of another file using the same handle. The Data Servers therefore attempt to detect these collisions. If a collision is detected, the Access Server will simply generate a new handle and try again.

It may be desirable to influence the PRNG with the cluster's workload distribution information. Typically, the "Law of Large Numbers" will create a fair distribution of messages across all Data Servers. Similarly, it is expected that operational workloads will be fairly evenly distributed across all Data Servers. However, if particular Data Servers have uneven workload, one may be able to weight the PRNG increase or reduce the resource burden on individual Data Servers.

5. Handle Generation

Two different methods are used to generate handles for a data object. The methods for metadata objects and for stable storage objects are discussed below.

All metadata objects have names that can be derived from the type of object. Each message delivery queue is assigned a name by system administrators, e.g., "as5-default-queue". Each mailbox is named by the username and domain of its owner, e.g., "bob@sendmail.com" or "bob@example.com". Each folder is named by its folder name as well as the mailbox which contains it, e.g., "INBOX" of "bob@example.com" or "letters/grandma" of "bob@example.com". The mailbox name and folder name are concatenated together, separated by a colon.

The handle of a metadata object is the result of an MD5 checksum of its name, e.g., MD5("as5-default-queue"), MD5("bob:example.com"), or MD5("bob:example.com:IN-BOX"). This handle input to the Consistent Hashing Algorithm to determine the set of 2f+1 Data Servers which store copies of this metadata object.

There is a very small, but non-zero, probability that the handle of two distinct metadata objects may be equal. It is the Data Server's responsibility to store the un-hashed name of each object in order to detect accidental collisions. All Data Protocol operations upon metadata objects identify the object by type (i.e., queue, mailbox, or folder) and un-hashed name.

Stable storage objects are accessed in a fundamentally different manner than metadata objects. To continue with the UNIX file system analogy, a UNIX file cannot normally be operated upon without first knowing its name. System calls such as rename( ) and unlink( ) operate require only a file name(s). System calls such as open( ) return a file descriptor which is used in subsequent operations, such as read( ) and write( ). The operating system uses the file name to determine which file system stores the file and the inode of the file's contents. The (file system, inode number) tuple is state maintained with the file descriptor state; for each descriptor-based operation, e.g., read( ), the operating system utilizes the (file system, inode number) tuple to actually operate upon the proper file.

The handles for stable storage objects are generated in a different manner because they are accessed in a different manner: as with UNIX file system inodes, they cannot normally be accessed without first consulting one or more metadata objects to determine the stable storage object's handle (which is stored in metadata). Therefore the system has much greater latitude in selecting handles for stable storage objects. Stable storage objects need not be stored at well-known locations, i.e., well-known names.

Two methods can be used to generate handles for stable storage objects. The first is a pseudo-random number generator (PRNG). The only requirements for the PRNG are that it has the same range and size as the hash used for metadata object handles (i.e., 128 bits for an MD5 hash) and that it has an even distribution across the entire range. The other method utilizes system information to generate a handle guaranteed to be unique throughout the lifetime of the cluster. This method combines the current wall-clock time, Access Server hostname, UNIX process ID number, process thread ID number, and an incremented counter to create the handle.

The latter method has the advantage that there is no chance, by definition, that two identical handles can be generated. It is immune to several subtle race conditions generated by the former method and thus is the preferred implementation.

6. Ordering of Operations Upon Stable Storage and Metadata

The currently-preferred embodiment does not provide any mechanism to perform multiple data-changing operations atomically, i.e., in a transaction-oriented or "all-or-none" manner, across Data Servers. In order for the stable storage object reference counting mechanism to function properly, it is important that certain orders of operation be strictly adhered to. These orders of operation cannot ensure that the reference counts of stable storage objects are always correct, but they can ensure that all stable storage objects' reference counts, if incorrect, are always too high.

The invention uses the following orders of operation to assist with the maintenance of cluster-wide message-store integrity:

(1) All f+1 replicas of a stable storage object must be successfully committed to persistent storage before any of the 2f+1 replicas of a metadata reference pointing to that object may be created.

(2) The reference counts of all f+1 replicas of a stable storage object must be incremented before any of the 2f+1 replicas of another metadata reference pointing to that object may be created.

(3) All 2f+1 replicas of a metadata reference pointing to a stable storage object must be deleted before the reference count of any of the stable storage object's f+1 replicas may be decremented.

Due to the close resemblance between the UNIX file system's inodes and directories and the invention's stable storage objects and their metadata, it is not surprising that the orders of operations to prevent reference counts from falling below their correct value are the same. The Berkeley Fast File System (FFS) is a widely-used file system by several major variations of UNIX. See, e.g., Marshall K McKusick et al., *The Design and Implementation of the 4.4BSD Operating System*, Addison Wesley, 1996, particularly at Chapter 8, page 284, for a discussion of the synchronous order of operations used by FFS to help maintain file system integrity, the disclosure of which is hereby incorporated by reference.

7. Actual Implementation in a File System-Based Environment (a) General

Whereas an RDBMS or other database system can be used in the invention, the UNIX file system, together with the well-defined semantics of several UNIX I/O system calls, provide the support required to implement f+1-distributed stable storage and 2f+1-distributed metadata.

(b) Stable Storage Object Structure

The contents of a stable storage object are, by definition, immutable. However, there are attributes of a stable storage object which must change: the reference count and the list of backreferences. These mutable attributes must be maintained in a manner which maintains message integrity despite having only f+1 replicas to tolerate f faults.

The UNIX file system stores the contents of a file and its associated attributes (e.g., last modification timestamp, access list) in an "index node" or "inode". The inode does not, however, include the file's name. The file's name is stored independently within the file system's name space. The name space may contain several names which all refer to the same inode and thus to the same file. See the above-mentioned McKusick et al. reference at p. 251, FIG. 7.7, which illustrates, for instance, two file names in two separate directories which refer to the same inode.

Each inode has a reference count, which keeps track of the number of names within the name space that refer to the inode. When a new name for the file is added to the name space (e.g., by the creat( ) or link( ) system calls), the inode's reference count is incremented. Conversely, when a name is removed from the name space (e.g., by the unlink( ) system call), the corresponding inode's reference count is decremented. If an inode's reference count drops to zero, all storage resources utilized by the inode are freed by the file system. See the above-mentioned McKusick et al. reference for a thorough discussion of the UNIX file system.

Three UNIX file system-related system calls are guaranteed to operate in an atomic manner:

(1) The rename( ) system call, used to change the name of a file and/or move it to a different subdirectory;

(2) the link( ) system call, which creates an alternative name for the same file in a different place within the file system's name space; and (3) the unlink( ) system call, which removes one of (the possibly many) names of a file from the file system's name space.

These three system calls, in concert with the orders of operation described above, are sufficient to maintain message integrity within the invention's message store.

The UNIX file system provides an atomic file creation operation, but the guarantee is limited to the allocation of the inode and a single insertion into the file system's name space. It does not guarantee that data can also be simultaneously written to the newly-allocated inode.

For example, assume the MTA needs to queue a 100-megabyte incoming e-mail message. A Client Daemon instructs f+1 Data Servers to create a stable storage object to store the body of the message. Each Data Server creates a standard UNIX file within one of its file systems to store the body. As the message data is received by the MTA, it is sent to each Data Server, which appends it to the file. However, after 95% of the message data has been received, one of the f+1 Data Servers crashes. The UNIX file system does not provide a mechanism to remove the incomplete file when the Data Server reboots.

At a glance, the orders of operation used by the invention do not require it: metadata references to a new stable storage object cannot be created until all replicas of the object have been successfully created. The Client Daemon is aware that only f of the object's replicas were created successfully. The Client Daemon may create another replica of the object on another Data Server (i.e., message queueing and delivery proceeds successfully), or it may pass the error back to the MTA (i.e., message queueing fails, higher-level protocols are used to retransmit the e-mail message at a later time). Neither case results in message store corruption.

However, in the event that a Data Server crashes with a large storage file (e.g., 95-megabyte file) which is unaccounted for, a resource "leak" results, thus wasting storage space. Without checking that object's backreferences, there is no way for the system to tell if the object is legitimately linked into the message store or if it should be removed and its storage space reclaimed. In order to safely reclaim such lost space, stable storage objects are created using the following algorithm:

1. A new file is opened using a temporary file name. The naming convention used specifically identifies the file as being temporary in nature, e.g., by using a ".tmp" suffix.

2. The object's data is appended to the temporary file as it becomes available. Each time data is appended to the file, its inode's last modification timestamp is updated.

3. If there are long periods of time when no new data for the object is available, the file's last modification timestamp is updated as an indicator that the temporary file is still in use.

4. When all of the object's data have been received and have been successfully written to persistent storage (i.e., using the fsync( ) system call), the file is renamed using a naming convention separate from the temporary file naming convention.

5. Periodically the Data Server's file systems are swept for all files named with the temporary file naming convention. Any such file with a last modification timestamp older than a configurable timeout value, e.g., 1 day, is a temporary file that has been abandoned and can be deleted to reuse its storage resources.

This algorithm does not rely on checking the object's backreferences, which is a much more time- and I/O-consuming activity. It does not directly address the stable storage object's reference count or backreferences attributes. However, a simple modification of the algorithm can safely create all of an object's required attributes. The change is simple: use a naming convention for the "final" file name which encodes the object's backreference attribute into the file name. Nothing need be done explicitly for maintaining the reference count attribute: the UNIX file system automatically does it.

This file naming convention uses the object's handle to create the directory pathname used for the "final" name. The handle is converted to an ASCII hexadecimal representation, e.g., 0xD41D8CD98F00B204E9800998ECF8427E. The backreference attribute depends on whether the backreference is for a message delivery queue control file or for a block of message text. For the former, the message queue name and queue control identifier are concatenated, using a colon as a separator, e.g., "as5-default-queue:CAA57074". For the latter, the user name, domain name, and folder name are concatenated, using colons as separators, e.g., "bob@example.com:f:INBOX". Finally, the complete file name is created by concatenating the backreference type (e.g., "q" for queue control file, "H" for message header, etc.), the hexadecimal handle, and the encoded backreference, e.g., "q:D41D8CD98F00B204E9800998ECF8427E: as5-default-queue:CAA57074" or "S:D41D8CD98F00B204E9800998ECF8427E: bob@example.com:INBOX".

UNIX file systems, which few exceptions, can provide acceptable I/O performance with more than a few thousand files in any particular directory.

Typical file systems provide diminishing performance characteristics as large numbers of file system entities (files, directories, etc.) are stored in a single directory. In this scheme, all stable storage object files could be placed in the same directory, but the resulting performance could be disastrous. Therefore it is advantageous to take advantage of the UNIX file system's hierarchical nature to distribute stable storage objects' files evenly across a large number of directories and subdirectories to avoid the performance penalty.

The evenly-distributed methods used for generating stable storage object handles becomes significant here: portions of the handle itself can be used to generate the intermediate subdirectory names. For example, to create three intermediate subdirectory levels, each consisting of 256 members, the first 3 bytes of the handle are converted to an ASCII hexadecimal representation and separated by the directory separator, the forward slash: "/". For example, the handle 0xD41D8CD98F00B204E9800998ECF8427E would yield "D4/1D/8C" as an intermediate subdirectory prefix.

The final step of the stable storage object file naming algorithm is the path prefix. This prefix is simply a constant and can be set at the system administrator's discretion. For the purposes of discussion, the prefix "/smm/data" will be used as a path name for all data references in all examples.

Under the "/smm/data" tree subdirectories named "messages", "queue", and "mailboxes" will be used to represent the location of immutable message components, queue metadata, and mailbox metadata respectively.

To illustrate the stable storage object file naming algorithm, assume a stable storage object, storing message text, has the handle 0xD41D8CD98F00B204E9800998ECF8427E and that it is to be referenced by a metadata pointer in a queue control file "CAA57074" in the message delivery queue "as5-default-queue". The full pathname to the file storing the object is "/smm/data/messages/messages/D4/1D/8C/S: D41D8CD98F00B204E9800998ECF8427E:as5-default-queue:CAA57074".

Figure 5:
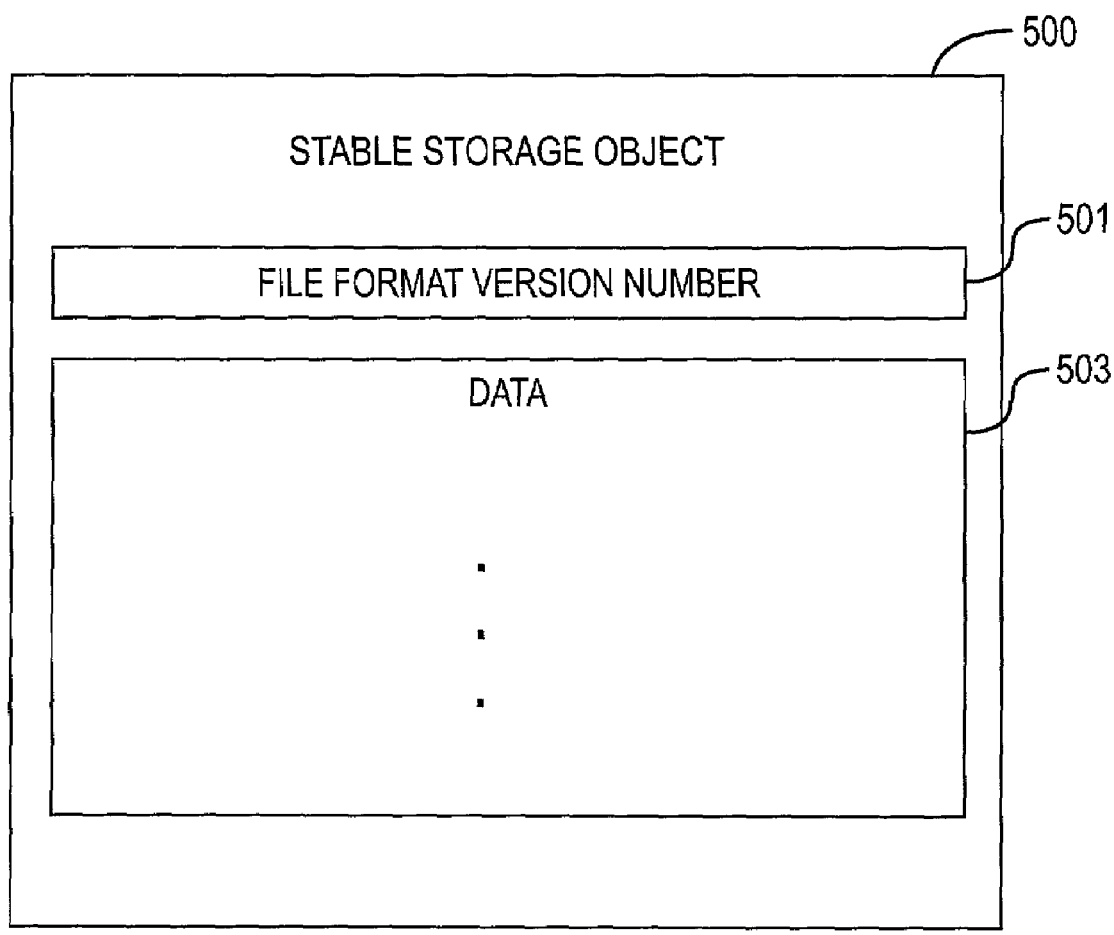
FIG. 5 is a block diagram illustrating layout of a stable storage object in the system of the present invention.

The format of a stable storage object file 500, as shown in FIG. 5, is a simple data structure. A file format version number 501 is found at the beginning, followed by one or more chunks of stable storage data 503. Each chunk can contain a message header or message body. The format permits several related chunks of information within the same stable storage object file for efficiency reasons. For example, if an e-mail message is addressed to three recipients, and the MTA determines that the message's headers must be edited differently for each recipient, the MTA can write all three headers into a single stable storage object file rather than three separate files. The message's metadata contains information describing the starting offset and length of the header chunk, making it possible to retrieve the correct set of headers by each recipient.

As described earlier, each name for the stable storage object file within the UNIX file system's namespace represents a backreference to a metadata association with the file. The sum total of these links is stored in the UNIX file system inode reference count.

Most UNIX file systems limit the size of an inode's reference count and thus the number of names a file may have. The Berkeley FFS, for example, stores the inode reference count in a 16-bit value, which creates a limit of 65,535 links. If a stable storage object requires more links than the file system can support, another copy of that object is made, and the references are split between the copies. For example, if a single message is to be delivered to 100,000 local recipients, but the underlying file system can only support 65,535 links per inode, then an additional copy of each of the message's stable storage object(s) can be made, and the 100,000 references can be divided evenly among both copies of each object.

(c) Metadata Structure

Both message folders and message delivery queues store 2f+1 metadata replicas of each metadata object. However, the I/O access patterns of the two types of metadata are quite different. Accordingly, they are stored in different manners within the UNIX file system.

(1) Message Folder Metadata

A message folder metadata file contains all information required for mailbox maintenance, including the handles used to retrieve the text of the messages stored in the folder. A mailbox is defined as the set of IMAP folders owned by a single user. The default folder to which the LDA delivers new messages is called an INBOX. Each POP user's mailbox is their IMAP INBOX folder. The system makes no distinction between the two, and a user's POP mailbox and IMAP INBOX may be referred to interchangeably for the discussion which follows.

Figure 6:
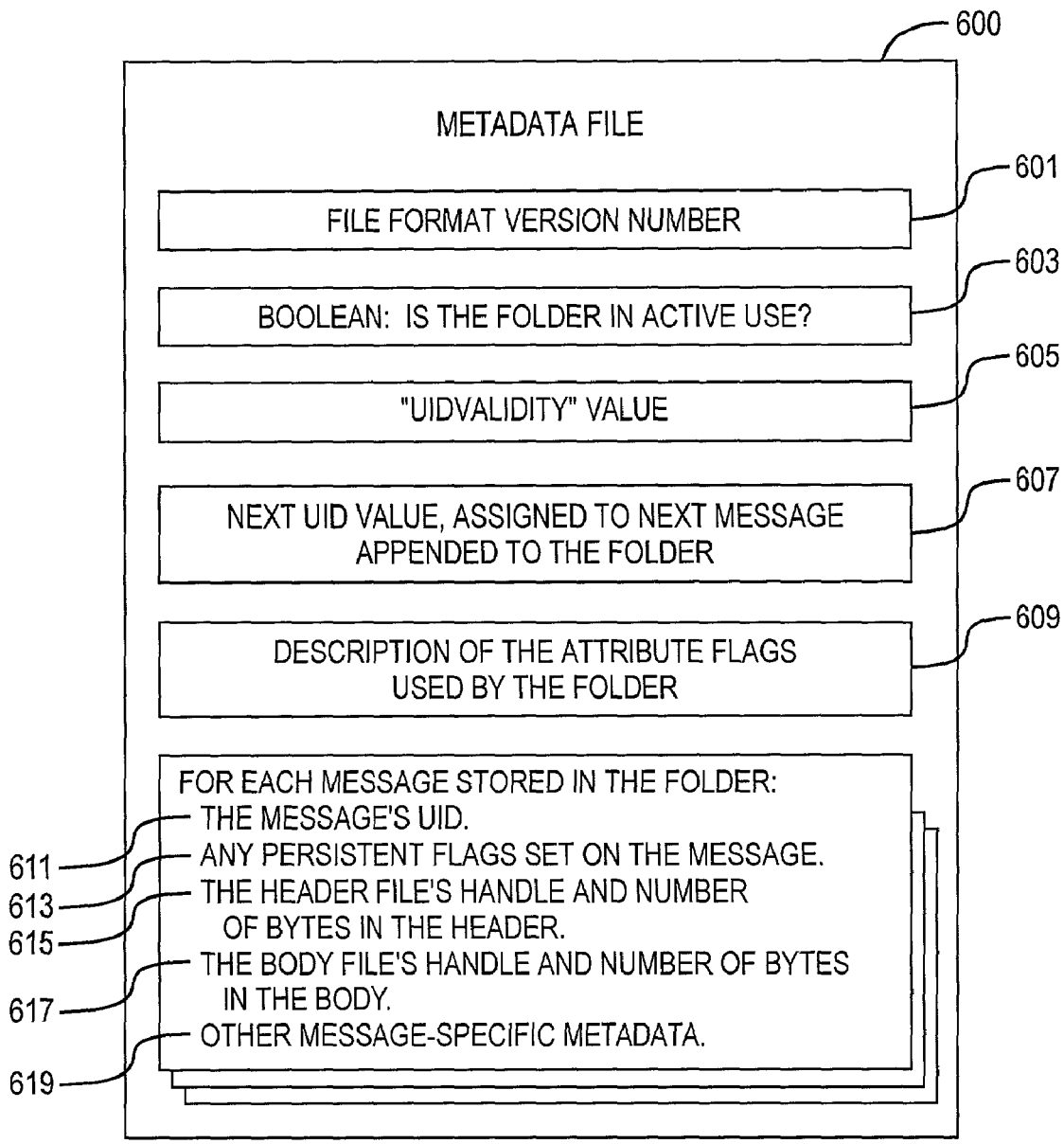
FIG. 6 is a block diagram illustrating layout of a metadata file in the system of the present invention.

As illustrated in FIG. 6, a metadata file 600 stores the file format number 601, a boolean value 603 indicating whether the folder is in active use, a UIDVALIDITY value 605 (to support the IMAP protocol's UIDVALIDITY value of the folder), a UID value 607 (the message number assigned to the next message appended to the folder), and a description 609 of the attribute flags used by the folder. Additionally, for each message stored in the folder, the metadata file includes the message's UID 611; any persistent flags set on the message 613; the handle, beginning byte offset, and length of the message's header 615; the handle, beginning byte offset, and length of the message's body 617; and other message-specific properties 619, e.g., mutable header information which was not known at the time the stable storage object was created.

(2) Message Delivery Queue Metadata

Message delivery queue metadata is accessed quite differently than message folder metadata. The reasons lie with implementation of the sendmail MTA and the best mode to date for integrating the invention with the pre-existing sendmail code base.

Each message, as it is received by sendmail, is assigned a queue control identifier. That identifier is used to name the queue control file for the message, which is stored in a central UNIX directory. The queue control file contains all data relevant to each recipient's delivery status. Once the message has been delivered successfully to all recipients (or if delivery to a recipient(s) fails with a permanent error), the queue control file is deleted from the queue directory, which signifies that the MTA has finished processing the message. At any time the MTA is attempting to deliver a message, it obtains an exclusive lock on the corresponding queue control file to prevent other MTA processes from attempting delivery of that message. As the delivery state of a message changes (e.g., message delivered to 10 recipients successfully, 8 recipients remaining), the MTA will periodically replace the queue control file with another containing new state information; if the MTA crashes, the newer state in the queue control file will avoid re-delivery to recipients who have already received a copy of the message.

The historical mechanism used by sendmail to create and update its queue control files resembles the invention's stable storage objects in two important ways. First, a queue control file either exists in the queue control file directory (often referred to as "the queue") or it does not. Second, queue control files are not updated "in place": rather the new state is written to a temporary file, and then the new temporary file is renamed to the same name as the old queue control file. The UNIX file system provides atomic semantics in this case: the old queue control file is unlinked (and deleted, since its reference count is now zero, because additional links for queue control files are never created) and the new one assumes the name of the old one.

In a redundant environment, a sendmail process, the Client Daemon, or an entire Access Server may crash after some of the copies of the queue control file have been edited yet some have not. Queue control files cannot be stored using the stable storage algorithm, instead quorum voting must be used. This is because a queue control file may be replaced by another with the same name but with different contents. Since these cannot be told apart, if a process fails while substituting some, but not all, of a set of queue control files, doing a single read would not provide enough information to know if these operations have succeeded or failed. All queue control files are stored three times and read using quorum voting to guarantee their integrity.

The internal structure of a queue control file is, simply, the format of the sendmail queue control file (also known as the "qf" file) historically used by sendmail. It is described fully in Chapter 23 of *sendmail, Second Edition* by Costales and Allman, O'Reilly, 1997, the disclosure of which is hereby incorporated by reference. Only minor changes to its format:

(1) The I code letter, the df file inode, no longer has any meaning and is no longer used.
(2) A new code letter is added to store the handle, starting byte offset, and length of the message's body.
(3) A new code letter is added to store the handle, starting byte offset, and length of the message's headers. Unlike the body, the queue control file may refer to several sets of headers for different classes of recipients. Therefore this new code letter would be used in a manner similar to the C code letter (i.e., the controlling user), possibly appearing multiple times.

The only significant difference with prior sendmail implementations is that the invention requires that all queue control files be written 2f+1 times. This provides fault tolerance via quorum voting: the consensus determines if the control file exists and, if so, its contents.

(d) Metadata File Naming Convention

One of the properties of metadata is that it provides the name space in which all objects in the system, metadata and stable storage objects alike, are locatable and retrievable. The lookup process for any object must start with a metadata object with a well-known name. The well-known name for a message delivery queue is assigned to the queue by the system's administrators, e.g., "as5-default-queue". The well-known name for a mailbox is the user's name and domain name, e.g., "bob@example.com". A message folder is named relative to its mailbox name.

Metadata file naming convention is very similar to the one described for stable storage objects. The chief difference is that the object's handle is generated by a hash, for example, using the MD5 algorithm, of the well-known name. The use of MD5 specifically is not recommended, as it is more computationally expensive than necessary for these purposes, but it will be used here as an example. In its best mode of operation, the use of any of several hash functions is recommended such as those described by Knuth in *The Art of Computer Programming,* Vol. 3, $2^{nd}$ ed., pp. 513ff, which is hereby incorporated by reference.

One can calculate the path name of the metadata for a mailbox. For example, assume one wants to determine the full path for the mailbox of user "bob" within the domain "example.com". First, the handle may be calculated: MD5 ("bob@example.com") =0xF1E2D1F542273BA0A30751482519C18C. Using the same intermediate subdirectory scheme, the "mailboxes" secondary identifier, and top-level prefix, the full pathname is determined to be "/smm/data/mailboxes/F1/E2/D1/m: bob@example.com", where the type prefix "m" denotes a mailbox. This pathname is a directory which stores the metadata for the mailbox's folders, as described below.

The IMAP protocol provides a hierarchical namespace for naming folders. This hierarchy maps nicely onto the UNIX file system's hierarchy. The only difference is that the IMAP server can specify the hierarchy delimiter character used within the folder hierarchy; the UNIX file system must use the forward slash, "/". The invention's IMAP server uses the colon, ":", as the hierarchy delimiter.

The invention stores a mailbox's folder metadata object files within the UNIX file system hierarchy named by the mailbox's pathname (as described above). These metadata object files use a type prefix of "f" to denote folder metadata. If the folder's name contains the folder hierarchy delimiter, a UNIX file system subdirectory hierarchy is created to mirror the folder hierarchy. For example, the full pathnames for folders named "INBOX", "letters:danny", "letters:

kirsten", and "letters:dad:funny" belonging to the user "bob" within the domain "example.com", utilizing the directory prefix schemes as all previous examples, are "/smm/data/mailboxes/F1/E2/D1/m:bob@example.com/f:INBOX", "/smm/data/mailboxes/F1/E2/D1/m:bob@example.com/letters/f:danny", "/smm/data/mailboxes/F1/E2/D1/m:bob@example.com/letters/f:kirsten", and "/smm/data/mailboxes/F1/E2/D1/m:bob@example.com/letters/dad/f:funny", respectively.

| Filename Prefix | Purpose |
| --- | --- |
| f | Folder metadata |
| m | Mailbox directory |
| Q | Message delivery queue directory |
| q | Message delivery queue control file |
| S | Stable storage message body |
| H | Stable storage message header |

F. Detailed Operations Examples

For the purposes of this illustration, the following assumptions are made:

(1) The current system View consists of 8 Data Servers, named DS0 through DS7.

(2) The system is operating in a mode to withstand a single Data Server failure without data loss, i.e., the value of f, for the purposes of storing 2f+1 metadata replicas and f+1 stable storage object replicas, is 1.

(3) The queue name assigned by the MTA or Client Daemon to the incoming message is "as5-default-queue". The handle for this queue is MD5("as5-default-queue") =0x2F3436B2AB4813E7DB3885DFA2BA1579. The Consistent Hashing Algorithm determines that, in the current system View and fault tolerance level, this handle's Data Server location set is {DS1, DS2, DS3}.

(4) The queue identifier assigned by the MTA to the incoming message is "CAA57074".

(5) The handle derived to store the message's body is 0xD41D8CD98F00B204E9800998ECF8427E. The handle and the current system View, by the Consistent Hashing Algorithm, determines that the handle's Data Server location set is {DS0, DS3, DS4}. Recall that despite the three Data Servers listed here, the stable storage item will be stored only on the first two in an f+1 redundant situation. It will be stored on the third Data Server in this list, DS4, if either DS0 or DS3 is not available at the time the Client Daemon goes to write this message body.

(6) Data Servers store metadata and stable storage objects in an intermediate subdirectory hierarchy that uses three levels of 256 subdirectories each. The first 24 bits of the handle are used to name these subdirectories, or 8 bits per subdirectory. At each level, the 8-bit value is converted to an ASCII hexadecimal to name each subdirectory, i.e., at each level the subdirectories are named "00" through "FF".

(7) The message's headers, at queueing time, are stored within the message queue control file. This has been sendmail's queueing method for years; it gives the MTA great flexibility in how it rewrites the message's headers. While the MTA could have written the headers into the stable storage object used to store the message's body, or it could have written the headers into a separate stable storage object, for the purposes of this example, sendmail follows its historical behavior.

(8) No errors occur during the processing of the message. If an error occurs, e.g., a queue control file with the same name already exists or a Data Server in an object's location set is down, the algorithm descriptions elsewhere in this document describe what steps, if any, must be taken to continue processing.

1. EXAMPLE

Message Queueing

Figure 7:
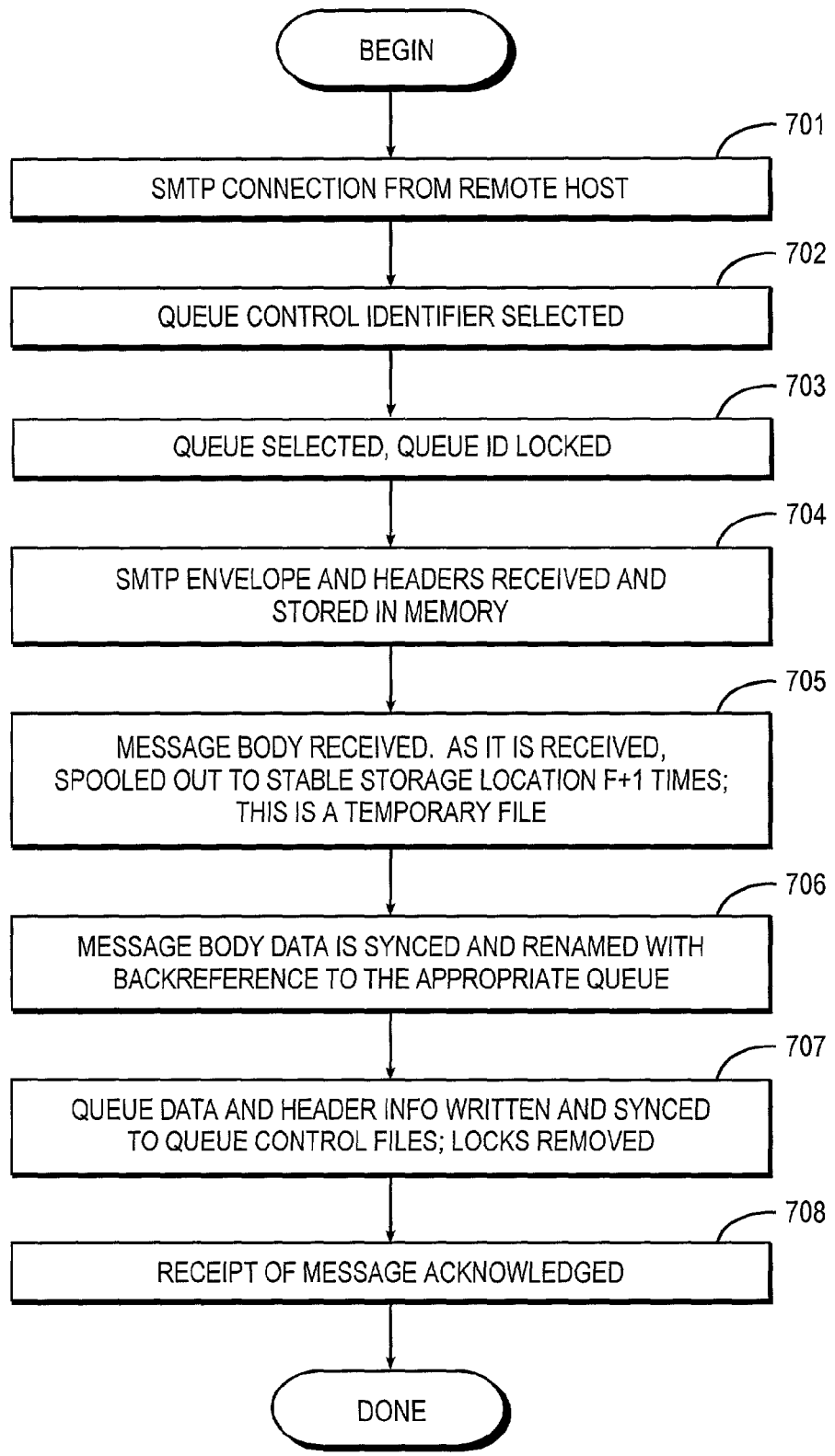
FIG. 7 is a flowchart illustrating message delivery methodology in accordance with the present invention.

With reference to FIG. 7, the following example illustrates the process steps that occur, from a data storage perspective, when the MTA receives and queues a message for subsequent delivery. The example assumes the message is being received via the SMTP protocol, but the same procedures are used by the MTA to queue the message, regardless of the protocol or method used to receive it.

First, the MTA receives an SMTP connection from a peer server 701. The MTA assigns a message delivery queue and queue control identifier (called the "queue ID") to the as-yet unknown message 702. The Client Daemon locks a message queue control file named by the queue ID on the 2f+1 Data Servers, then stores the message in the delivery queue 703 which verifies that a queue control file by that name does not already exist. Specifically, on each of the Data Servers, a lock is successfully granted for "CAA57074" in the queue "as5-default-queue". It then verifies that the file /smm/data/queue/2F/34/36/Q:as5-default-queue/q:CAA57074 does not already exist.

When the SMTP DATA command is received, the MTA stores the message envelope and headers in its memory 704, and then selects a handle for storing the message's text. The Client Daemon selects two of the three eligible Data Servers in the handle's storage set to store the message's text in a stable storage object, DS0 and DS3, and asks them to prepare to create stable storage object replicas using that handle. If either is not up, DS4 will be queried to replace the unavailable Data Server. If more than one does not respond, the operation will be aborted 705.

From each Data Server's perspective, the file used to store a stable storage object with the handle 0xD41D8CD98F00B204E9800998ECF8427E is /smm/data/messages/D4/1D/8C/S:D41D8CD98F00B204E9800998ECF8427E:as5-default-queue:CAA57074. It verifies that that file does not already exist, and then opens the temporary file /smm/data/messages/D4/1D/8C/S:D41D8CD98F00B204E9800998ECF8427E.tmp to store the message text. In the file naming convention, the ".tmp" suffix denotes a temporary file.

As the body of the message is received, the data are passed in blocks to DS0 and DS3 714 and each Data Server appends these blocks to its respective temporary file. The data is copied in discrete blocks to avoid requiring the MTA, Client Daemon, or Data Server to buffer the entire message in memory at once.

When the SMTP DATA command is finished, the Access Server sends the final data block to the Client Daemon and tells it to finalize the stable storage object 706. Each Data Server flushes any pending data to persistent storage, e.g., disk and/or non-volatile RAM, the temporary file to its permanent name, e.g., /smm/data/messages/D4/1D/8C/S:D41D8CD98F00B204E9800998ECF8427E.tmp is renamed to: /smm/data/messages/D4/1D/8C/S:D41D8CD98F00B204E9800998ECF8427E:as5-default-queue:CAA57074.

Now that the message body is safely written, the MTA creates the message queue control file for this message 707.

It writes the message queue control file to the Client Daemon, which creates replicas of it in the proper locations. A temporary file is created, e.g., /smm/data/queue/2F/34/36/Q:as5-default-queue/q:CAA57074.tmp. When all the message queue control file data have been received and flushed to persistent storage, the temporary file is renamed to /smm/data/queue/2F/34/36/Q:as5-default-queue/q:CAA57074 on 2f+1 servers.

At this point, the lock on the message queue control file is relinquished, and the message queueing phase is completed. The MTA ACKs the receipt of the message by returning the SMTP message: "250 Message accepted for delivery" to the originating MTA and the SMTP session terminates, as indicated at step 708. The message is safely queued and awaits further processing for delivery.

2. EXAMPLE

Scanning a Message Delivery Queue for Idle Jobs

All of the assumptions made in the previous example are also made for this example, as well as the following:

It is assumed that only one queue, named "as5-default-queue", is currently assigned to the MTA. If the MTA was assigned multiple message delivery queues, the same process described below would occur on each queue in parallel or sequentially.

Figure 8:
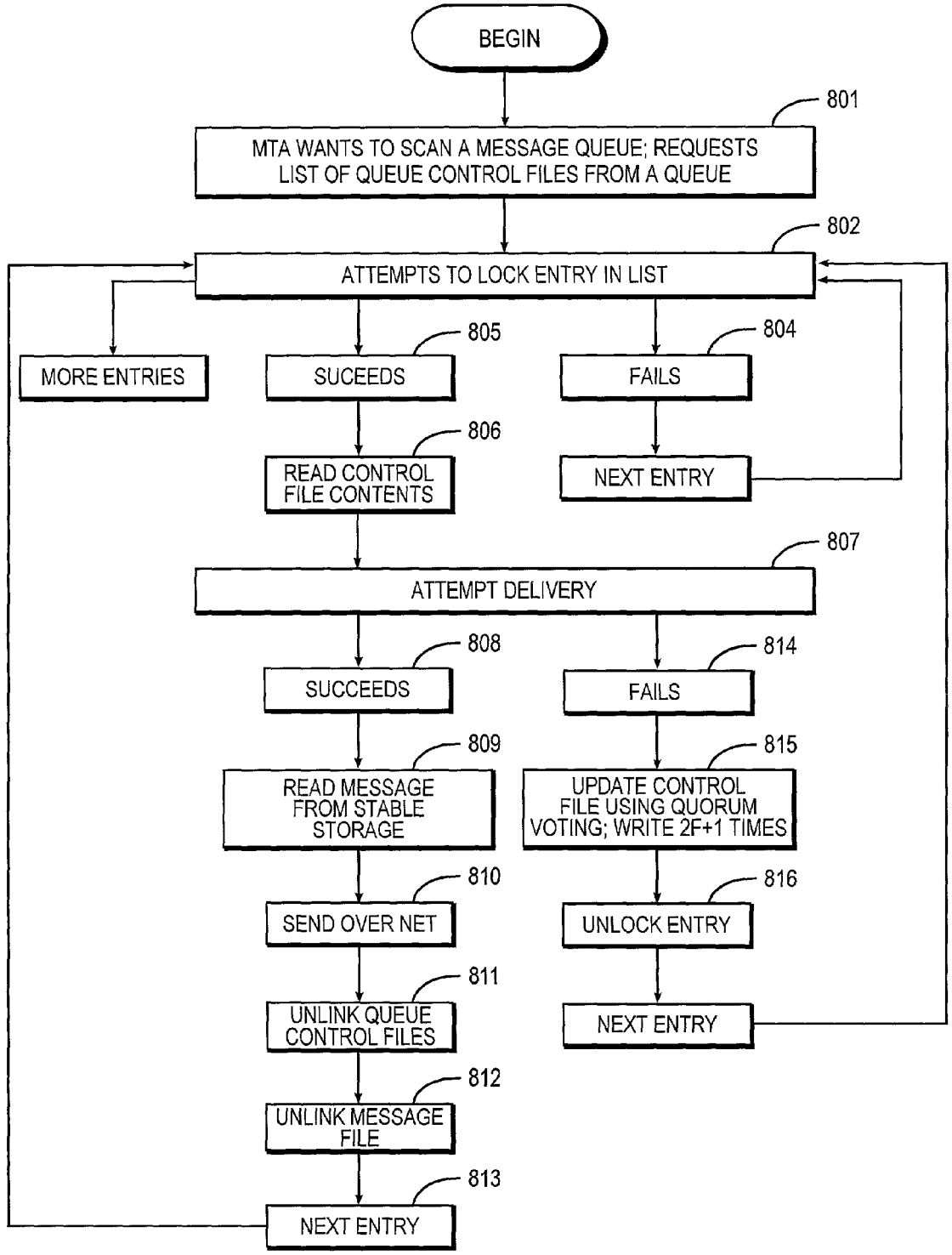
FIG. 8 is a flow chart showing the process of scanning a message queue.

First, a timer or other event within the MTA triggers a periodic scan of its message queue directories 801, as illustrated on FIG. 8. The MTA asks the Client Daemon for a list of all message queue control files within the "as5-default-queue" message queue. The Client Daemon requests that directory listing from each Data Server responsible for that queue's handle. Each Data Server, in turn, returns a listing of all files in the /smm/data/queue/2F/34/36/Q:as5-default-queue directory. The Client Daemon uses quorum voting, using two reads, comparing the two reads, and then issuing a read to the third Data Server if the first two reads disagree in order to "break the tie", to determine the directory's true contents and returns the list message queue control files to the MTA.

Then the MTA enters a loop where it locks each queue control file 802, attempts to read the contents of that file, and stores its contents in local memory. For illustration purposes, it is assumed there exists one message queue control file whose ID is "CAA57074". If the Client Daemon cannot obtain a global lock 804, it assumes that some other MTA process is processing that control file, and it continues with the next control file at the top of the loop. If successfully locked 805, the MTA reads the contents of the control file 806: the Client Daemon issues read requests for the message queue control file "CAA57074" in the message delivery queue "as5-default-queue" to AS1, AS2, and AS3. Each Data Server, in turn, retrieves the contents of the file /smm/data/2F/34/36/Q:as5-default-queue/q:CAA57074. The Client Daemon uses quorum voting to determine the file's contents and returns the consensus data to the MTA and a delivery attempt may be made 808.

3. EXAMPLE

Message Delivery to a Non-local Recipient

In addition to the assumptions made in the previous examples, the following assumptions are made for the purposes of illustration:
(1) The message is addressed to one non-local recipient, <user@domain.com>, and that this recipient's message can be delivered via SMTP to a remote SMTP server responsible (called the "mail exchanger") for domain-.com's e-mail.
(2) The queue ID assigned to this message is "CAA57074" (the same as used in the previous example).

Figure 9:
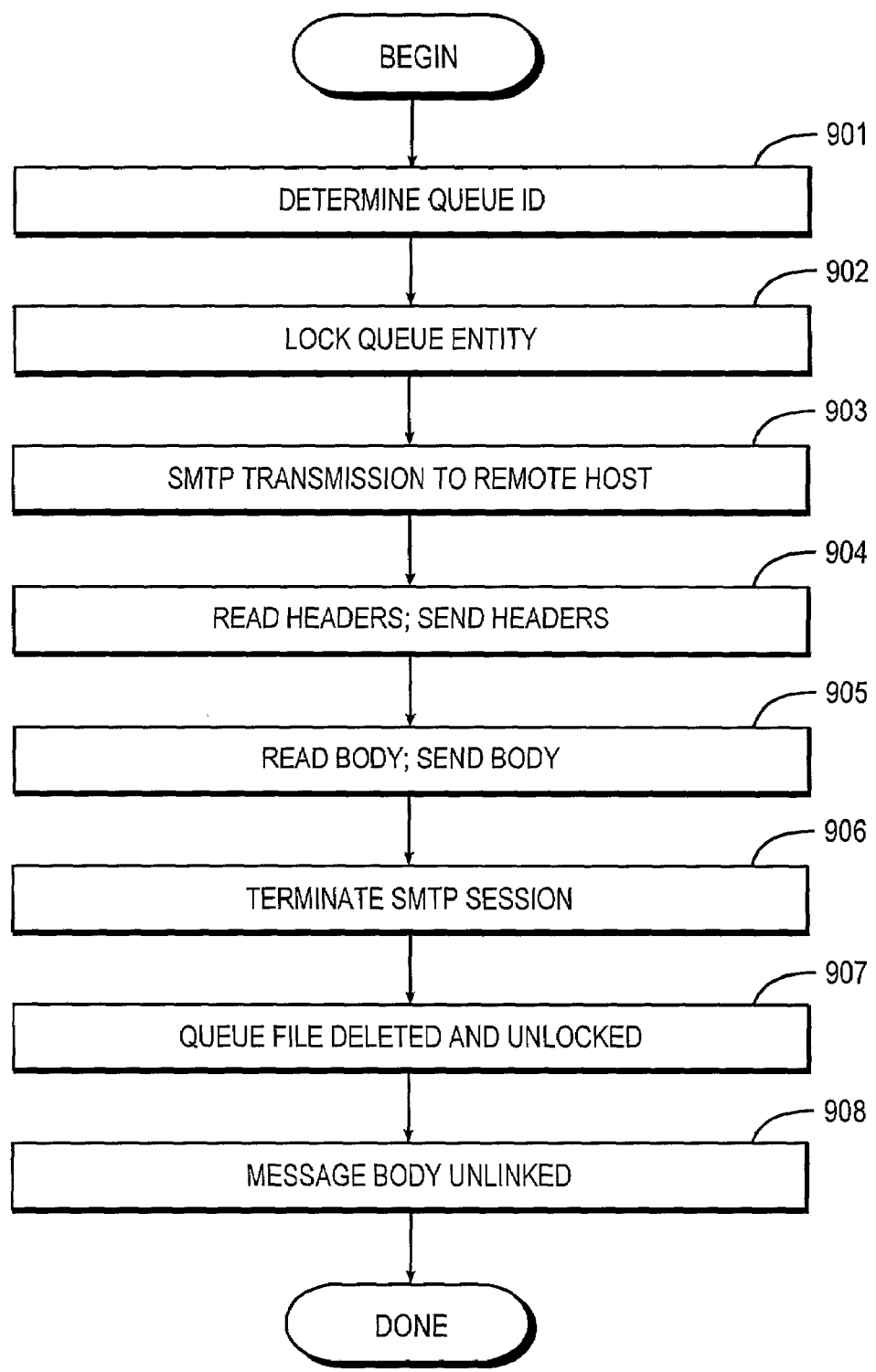
FIG. 9 is a flow chart showing the process of delivering a message from the queue to a remote SMTP server.

First, the message's queue ID must be known 901, as illustrated in FIG. 9. It may be known in advance: the same MTA process which queued the message may be the same MTA process attempting delivery, the MTA process attempting delivery was given the queue ID by the queueing MTA process, or the MTA process determines the queue ID via a message queue scan, as described in example #2 above. Once the queue ID is known, the message queue control file is locked 902, and its contents are read and stored in local memory.

Transmission of the message to the remote host begins 903. The envelope information is exchanged according to the SMTP protocol. The MTA then sends the SMTP "DATA" command and begins sending the message's text to the remote server 904. The message's headers are already known, because they are also stored in the message queue control file. The contents of the message body, however, are not yet known. The message queue control file stores the handle H=0xD41D8CD98F00B204E9800998ECF8427E, starting byte offset O, and length L of the stable storage object which stores the message body.

The MTA asks the Client Daemon for a data stream for handle H, beginning at byte O for L bytes, as referenced by queue ID "CAA57074" in the message delivery queue "as5-default-queue" 905. The Client Daemon calculates the location set for the handle and chooses one of the Data Servers to read it. The Data Server determines that the path for H would be /smm/data/messages/D4/1D/8C/S:D41D8CD98F00B204E9800998ECF8427E:as5-default-queue:CAA57074. If the Data Server cannot read the file because it does not exist, the Client Daemon chooses another Data Server from the location set. If the file does exist, the Data Server begins streaming the data to the Client Daemon, which forwards the data stream to the MTA, which forwards it to the remote SMTP server.

When the SMTP DATA command has finished and the remote SMTP server has returned a 250 status code (i.e., the message has been received and stored), the SMTP session is terminated 906. Because there are no more recipients for this message, the message queue control file is deleted and unlocked 907. The Client Daemon asks each Data Server in the message queue control file's location to delete "CAA57074" in the "as5-default-queue"; each Data Server in turn deletes the file /smm/data/queue/2F/34/36/Q:as5-default-queue/q:CAA57074 and unlocks it. The MTA then deletes the stable storage object H, as referenced by queue ID "CAA5707438 in the message delivery queue "as5-default-queue" 908. Each Data Server then deletes the file /smm/data/messages/D4/1D/8C/S:D41D8CD98F00B204E9800998ECF8427E:as5-default-queue:CAA57074. If the file system's namespace contains no other links to that file, the file system will automatically reclaim the storage space used by it.

4. EXAMPLE

Message Delivery to Local Recipients

In addition to the assumptions made in the previous examples, the following assumptions are made for the purposes of illustration:
(1) The MTA has already fully expanded the message's recipient list: it is addressed to one non-local recipient, <user@domain.com>, and two local recipients, <bob@example.com> and <carla@example.com>.
(2) The handle for "bob@example.com" is 0x9181DEAB4E17620D3524AED08C1D099B. The handle for "carla@example.com" is 0xEFB0B76CCC1873F6C874CC85D6D0C165. Below, they are called H1 and H2, respectively.

(3) The handle for the message's body stable storage object is 0xD41D8CD98F00B204E9800998ECF8427E (called Hb below).

Figure 10:
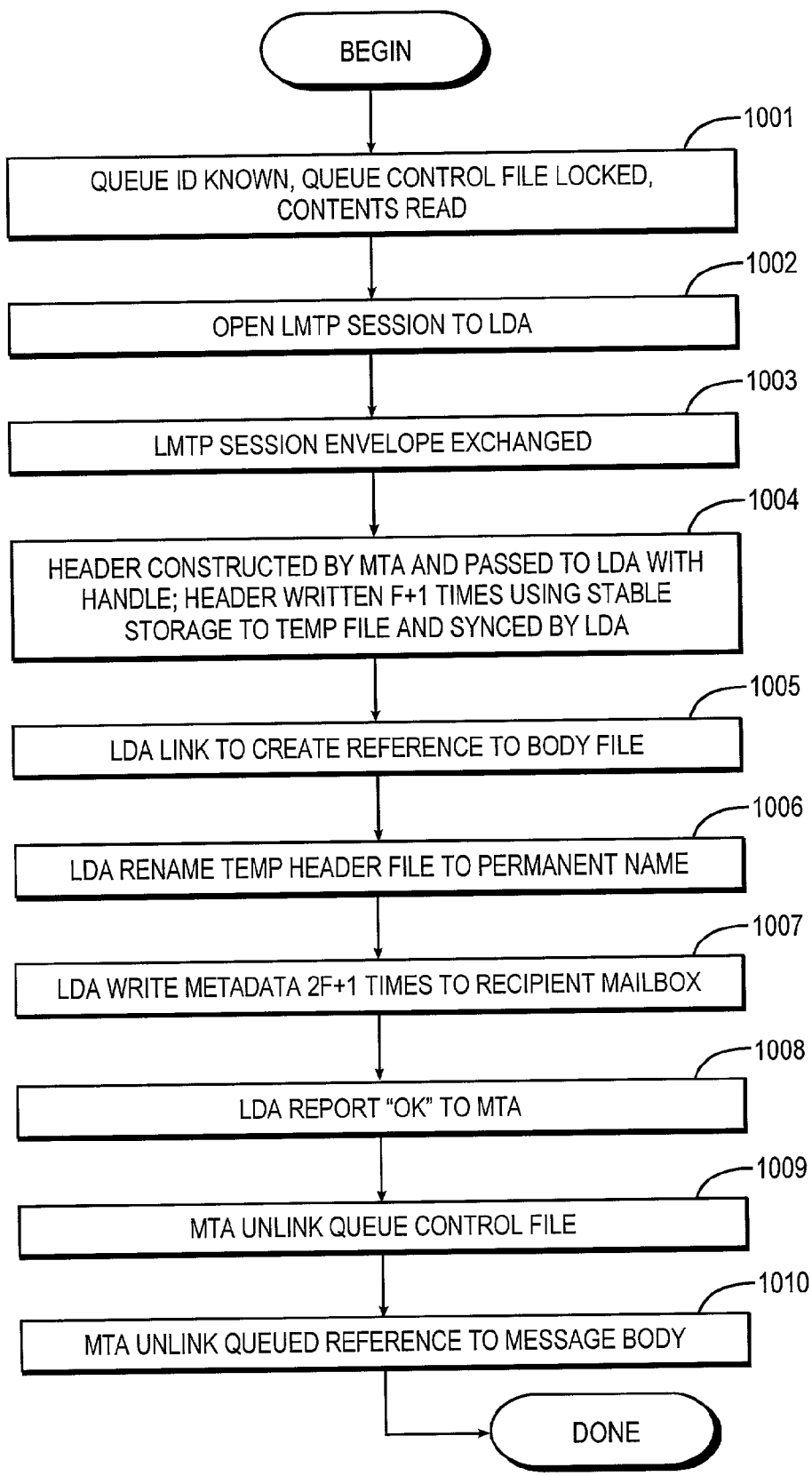
FIG. 10 is a flow chart showing the process of locally delivering a queued message.

First, the message's queue ID must be known, the message queue control file be locked, and the control file's contents be known 1001, as shown in FIG. 10. The procedures for doing so have been discussed in example #3 above. Assume the MTA attempts and fails to deliver the message to the non-local recipient, <user@domain.com>. This step is not a prerequisite for delivery to the local recipients, but it is required for demonstration purposes later in this example.

Next, an extended LMTP session is started with the LDA (Local Delivery Agent) 1002. An example session is shown below.

First, the MTA and the LDA exchange envelope information as defined by the protocol (explained fully in RFC2033) 1003. The MTA and LDA use their own extension to the LMTP protocol, the X-BODYREF command, to pass the handle for the message body through to the LDA., at 1004. This is enough information for the LDA to locate this data. Then when it comes time to deliver the message during the "DATA" phase of the LMTP session, the header is generated from the contents of the already-read queue control file and passed to the LDA.

The LDA creates a temporary header file in the same location as its corresponding body file at /smm/data/messages/D4/1D/8C/H:D41D8CD98F00B204E9800998ECF8427E.tmp.

Once the headers have been written out and synced to stable storage, the body file is linked to its new name 1005: /smm/data/messages/D4/1D/8C/S:D41D8CD98F00B204E9800998ECF8427E:bob@example.com:f:INBOX.

The header file is now renamed to its permanent name 1006: /smm/data/messages/D4/1D/8C/H:D41D8CD98F00B204E9800998ECF8427E:bob@example.com:INBOX.

Then, for each recipient's default folder, the LDA adds metadata references to the message in stable storage 1007 as well all other metadata components shown in previously-described FIG. 6. The MTA asks the Client Daemon to lock the folder and to retrieve the folder's next UID value, i.e., the sequence number to be assigned to the next message appended to the folder. The Client Daemon queries each replica of the folder for its UID value; each Data Server in turn examines the folder metadata file (e.g., for the first recipient, /smm/data/mailboxes/91/81/DE/m:bob@example.com:f:INBOX) for its UID value. The Client Daemon chooses the proper UID value and returns it to the LDA. The LDA then asks the Client Daemon to append the message metadata to the recipient's default folder. The Client Daemon forwards the request to all three Data Servers storing the folder's replicas. Once the update has completed on each copy of the folder 1007, it is unlocked. If at least two of the three folders are successfully updated, the Client Daemon reports success in delivering the message back to the LDA 1008, which reports its success back to the MTA.

Now that the MTA has finished work, for now, on this queue item, it's time to update the message queue control file with new status data 1009. If the message were delivered to all recipients, the message queue control file would be deleted and the queue's reference to the stable storage object storing the message body would be removed 1010. However, there is still one recipient that has not had a successful delivery. Therefore the MTA tells the Client Daemon to replace the old message queue control file with a new one, writes the new control file, and closes it. The Client Daemon instructs each of the three Data Servers in the queue's location set to update the queue control file in "as5-default-queue" called "CAA57074". The same process described in example #1 is used, with one exception: when the temporary file is renamed to /smm/data/queue/2F/34/36/Q:as5-default-queue/q:CAA57074, the old file "q:CAA5707438 is replaced as part of the operation.

5. EXAMPLE

Message Retrieval

In addition to the assumptions made in the previous examples, the following assumptions are made for the purposes of illustration:

The owner of the mailbox "bob@example.com" has authenticated properly with an IMAP server and wishes to retrieve a message from the folder "INBOX".

The message retrieval process is done in two phases. First, the contents of the folder must be determined from the folder's metadata. Second, the actual message text is retrieved from stable storage.

Figure 11:
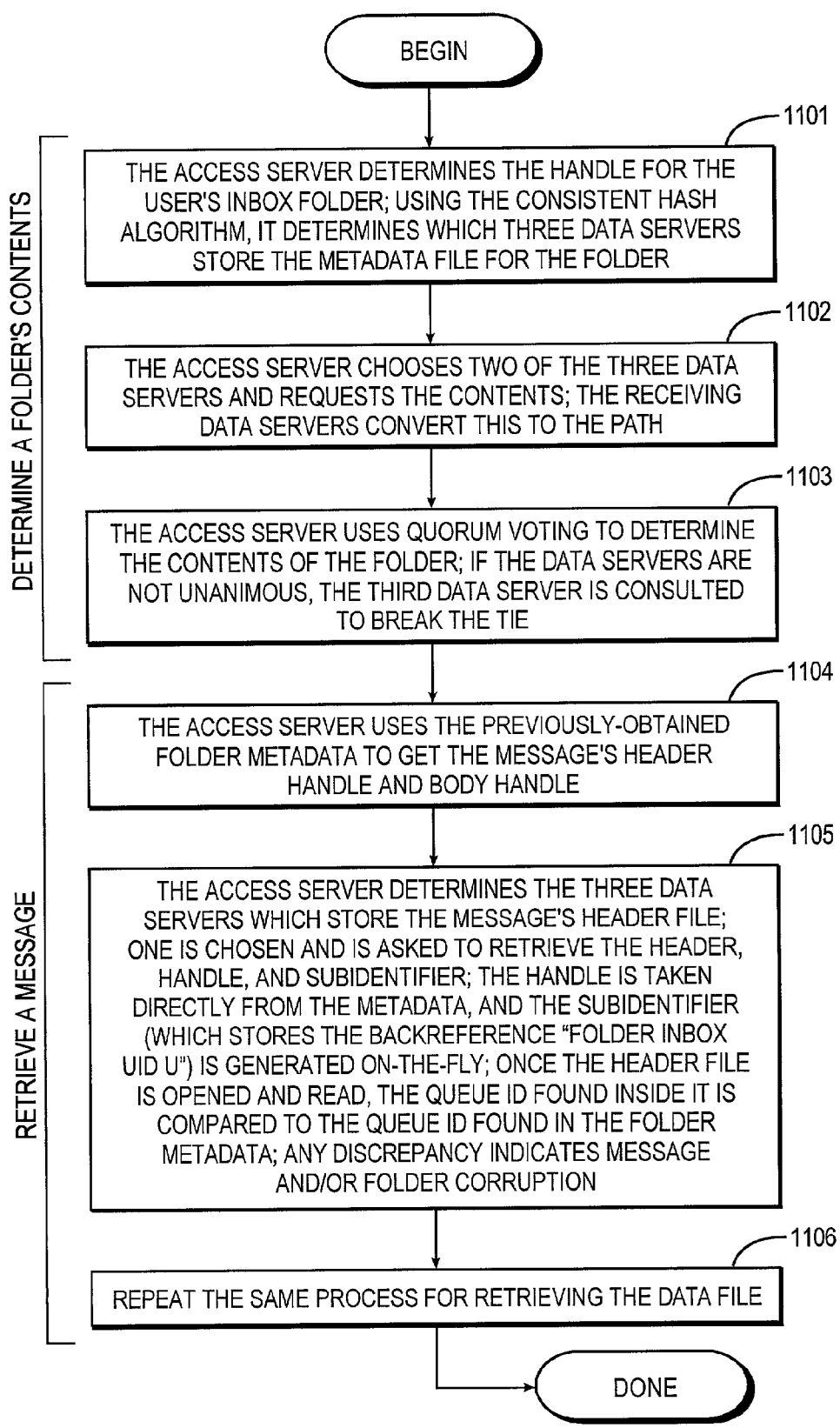
FIG. 11 is a flowchart illustrating message retrieval methodology in accordance with the present invention.

First, the IMAP server determines the handle for the mailbox "bob@example.com" 1101, as shown in FIG. 11, i.e., H=0x9181DEAB4E17620D3524AED08C1D099B. It asks the Client Daemon for the metadata contents of the mailbox "bob@example.com" folder "INBOX". The Client Daemon calculates the location set for the mailbox and requests the contents of the folder from two of the three Data Servers in the step 1102. Each Data Server locks the folder, reads the contents of /smm/data/91/81/DE/m:bob@example.com/f:INBOX, unlocks the folder, and returns the metadata to the Client Daemon. The Client Daemon uses quorum voting to determine the contents of the folder 1103; if the two replicas are not unanimous, the third Data Server is consulted to break the tie. (Any voting discrepancies are later corrected on the minority Data Server(s).)

Now that the IMAP server knows that the folder contains a message, it can retrieve it when the user requests it. The IMAP server uses the previously-obtained folder metadata to get the handle, starting byte offset, and length of the header and body portions of the message 1104. The IMAP server asks the Client Daemon to retrieve the contents of the header stable storage object's handle at proper offset for the proper length 1105. The Client Daemon calculates the location set for the handle and choses one of the three Data Servers to stream the data to the requesting Access Server. If that Data Server does not have a copy of /smm/data/messages/7A/07/E8/H:7A07E8E4EBD01B8568DD6446F72513BC:bob@example.com:f:INBOX, then another Data Server is chosen. The data is forwarded by the Client Daemon to the IMAP server which then forwards it to the user.

The same process used to retrieve the message's header is used to retrieve the message's body 1105. The body may be stored in a different stable storage object; in this example, it is: its handle is 0xD41D8CD98F00B204E9800998ECF8427E. Otherwise, the process is identical.

6. EXAMPLE

Deleting a Message From a Folder

In addition to the assumptions made in the previous examples, the following assumptions are made for the purposes of illustration:

(1) The owner of the "carla@example.com" mailbox wishes to delete a message from the "INBOX" folder. Recall that the handle for this mailbox is 0xEFB0B76CCC1873F6C874CC85D6D0C165.

(2) The contents of the folder have already been determined, using the same process described in example #5 above.

Assume the message to be deleted is the one described in example #4 above: recall that the header's stable storage object handle is 0x7A07E8E4EBD01B8568DD6446F72513BC and the body's stable storage object handle is 0xD41D8CD98F00B204E9800998ECF8427E.

First, the IMAP server asks the Client Daemon to remove the metadata for this message from the "INBOX" folder 901. For each of the three Data Servers, the Client Daemon requests that the folder be locked, the metadata for the message be removed, and the folder unlocked; each Data Server in parallel locks the folder, removes the metadata for the message from /smm/data/mailboxes/EF/B0/B6/m:carla@example.com/f:INBOX, and unlocks the folder. Like all edits of mutable data objects, it performs the edit by copying the file to the same name with a ".tmp" extension, editing the file there, then atomically renaming it to its original name.

Then the IMAP server asks the Client Daemon to remove the backreferences from the message's header stable storage objects and thus decrement its reference count 902. For stable storage object, the Client Daemon asks the Data Servers in the object's location set to remove the backreference for the mailbox "carla@example.com" folder "INBOX" from the object's handle. For this example, this results in the following unlink( ) system call on each Data Server which might store this data object:

```
unlink(
/smm/data/messages/7A/07/E8/H:7A07E8E4EBD01B8568DD6446F72513BC:carla@example.
com:INBOX )
```

The same process is done for the message body's stable storage object 903. In this case, this results in the following unlink( ) system call on each Data Server:

```
unlink(
/smm/data/messages/D4/1D/8C/S:D41D8CD98F00B204E9800998ECF8427E:carla@exampl
e.com:INBOX )
```
Note that it is expected that one of the three Data Servers would fail to unlink each stable storage object: those objects are only stored f + 1 times.

F. The Reference Count Sweeper

1. Introduction

In an ideal world, the reference counting scheme should be all that is required to maintain the system's message store integrity and to manage the disk storage resources of all Data Servers. The world is of course far from ideal. Most UNIX file systems require a program such as fsck to check the consistency of the file system because certain file system operations cannot be performed atomically or within the context of "database transaction" semantics (with abort, roll-back/roll-forward, and logging capabilities). The problem of maintaining complete consistency within a system cluster is even more challenging than in a UNIX file system: at least the UNIX file system is maintained by only one computer. The files, links, reference counts, and backreferences maintained by a system cluster are scattered across a number of Data Servers.

Today, there exists a multitude of garbage collection techniques developed over the years, though they employ only a few major algorithms. The following describes a "mark and sweep" algorithm to correct the reference counts of header files and body files stored in a system cluster. The sweeper process relies on an important invariant to avoid data loss:

For every stable storage object F, $r(F) \geq R(F)$, where $r(F)$ is the on-disk reference count for F and $R(F)$ is The True and Correct Reference Count for F.

2. The Sweeper Algorithm

This sweeper's algorithm does not correct all stable storage object reference count inaccuracies. Instead, its purpose is to find stable storage objects with non-zero reference counts which ought to be zero. Any objects with a True and Correct Reference Count of zero will be unlinked. A stable storage object that has a non-zero reference count which is too high does not hurt since, as long as it is non-zero, the system will not delete it. Thus, the system loses nothing by implementing this scheme even though it does not fix all incorrect reference counts.

At a given point in time, either automatic or administrator-initiated, the Command Server declares a reference count sweep S to begin at time T. Each Data Server receives the directive and starts a sweep of all of its metadata files. The process is divided into the following phases.

(a) Phase I: The Metadata Sweep

The entire metadata directory hierarchy is traversed recursively like the UNIX "find" utility does. Sequentially, each folder metadata file encountered is opened and parsed. For each unexpunged message in the folder, the system sends a reference message to the primary, secondary, and tertiary Data Servers that may be storing that message's header file and body file. The reference message contains the stable storage object type, handle, and the message delivery queue or mailbox+folder name. This phase of the sweeper need not attempt to verify that the reference is valid, as messages sent to the wrong Data Server will be detected and ignored in later phases.

Unlike a "find" operation, the recursive directory sweep should search subdirectories in a deterministic manner, e.g., by sorting subdirectory entries before processing them. This allows periodic checkpoints of the sweep to be done easily. If the Data Server crashes during the sweep, it can resume where it left off. The checkpoint frequency need not be very frequent: the algorithm does not care if a folder is swept multiple times. Nor does the algorithm care if folders are added, removed, or renamed after T but before the sweep process gets around to that folder. There are a couple of exceptions to this rule:

1. The algorithm cares about a race condition which would move a folder from an unswept portion to an already-swept portion of the Data Server's file system. The solution is to have the process attempting the folder move send reference messages for each message in the to-be-moved folder, regardless of whether or not the folder has been swept and regardless of whether the folder is being moved to a place in the file system which has already been swept. Once all the reference messages have been sent, the folder may be renamed.
2. The algorithm cares if a message is moved or copied from an unswept folder to a folder which has already been swept. The solution is to have the process of moving or copying the message send a reference message to each possible Data Server, regardless of the current state of the hierarchy sweep. Once the reference messages have been sent, the message may be copied.

Both of these concerns are addressed by the Command Server. When a sweep is in progress, the Access Servers can guarantee that both of these actions can be handled in a safe manner, allowing nothing to escape being swept eventually.

Once a Data Server finishes Phase I, it notifies the Command Server that it has finished Phase I of the sweep S.

(b) Phase II: Message Sorting

All of the reference messages are collected by Data Servers. When the Command Server has determined that all Data Servers have finished Phase I of the sweep S, the Command Server informs all Data Servers to begin Phase II. This phase involves processing and sorting all of the reference messages sent to it. The processing step involves converting the handle and folder/queue names to local pathnames. The sorting step involves creating a single large dictionary-order sort of all the paths. During sorting, all duplicates are removed from the final list.

Once a Data Server finishes Phase II, it notifies the Command Server that it has finished Phase II of the sweep S.

(c) Phase III: Sweeping the Header Files and Body Files

The Command Server informs the Data Server when it may begin Phase III of sweep S. This phase involves having each Data Server traverse its stable storage object storage hierarchy in the same dictionary sort order as the sort used in Phase II. The object list generated in this phase is compared to the list generated by Phase II. See table below for an example.

| Phase III Sweep Handle | File Creation Time | Phase II Sweep Handle | Action to Take |
| --- | --- | --- | --- |
| $H_a$ | T − 3243 | $H_a$ | Do nothing |
| $H_b$ | T − 200 | $H_b$ | Do nothing |
| $H_c$ | T + 2132 | $H_c$ | Do nothing |
| (none) | (none) | $H_d$ | Do nothing |
| $H_e$ | T − 233 | (none) | Delete $H_e$ |
| $H_f$ | T + 40 | $H_f$ | Do nothing |

A differential algorithm is used to compare the two lists. If a stable storage object is found in Phase III that has no corresponding entry in the Phase II list, the object's creation timestamp is checked. If that timestamp is greater than T (the time at which sweep S began), the object is ignored. If the timestamp of the object is less than T, its reference count ought to be zero and it can be safely removed at any time.

Situations where an object reference in the Phase II list does not have a corresponding entry in the Phase III list are not problematic, due to the Reference Count Invariant. This situation means the object was swept in Phase I but legitimately deleted before Phase III got around to checking this directory. It could also mean that the object has not been deleted but rather that this Data Server is one which does not store a copy of the stable storage object.

What is claimed is:

1. In an electronic mail (e-mail) system, a methodology for storing e-mail messages in a distributed manner across a plurality of data servers in order to tolerate f number of faults in a manner that allows the system to provide continuous operation, the method comprising:

for each e-mail message to be stored, dividing the message into a mutable portion and an immutable portion, said mutable portion comprising that portion of the message data which is subject to change after the message has been stored, said immutable portion comprising that portion of the message which is not subject to change after the message has been stored; and storing the message in a distributed manner by:
redundantly storing the immutable portion of the message as immutable message data, f+1 times among selected ones of said data servers, in order to tolerate f number of failures in a manner that allows the system to provide continuous operation; and
redundantly storing the mutable portion of the message as mutable message data, 2f+1 tines among selected ones of said data servers, in order to tolerate f number failures in a manner that allows the system to provide continuous operation, said mutable portion including a mutable pointer indicating where the immutable message data is stored.

2. The method of claim 1, wherein said mutable portion includes message header information.

3. The method of claim 1, wherein said mutable portion includes status information for the message.

4. The method of claim 1, wherein said immutable portion comprises static message data for the message.

5. The method of claim 1, wherein said immutable portion comprises a message body.

6. The method of claim 4, wherein said immutable portion is stored using large block Input/Output (I/O) storage technique.

7. The method of claim 1, further comprising:
in case of a fault, restoring the message from stored copies of said mutable and immutable portions.

8. A computer-readable medium having processor-executable instructions for performing the method of claim 1.

9. A downloadable set of processor-executable instructions for performing the method of claim 1.

10. An improved method for storing messages in an electronic mail (e-mail) system that processes e-mail messages in order to support fault-tolerant operation in a manner that allows the system to provide continuous operation, the method comprising:

for a given e-mail message, identifying a first portion of the message that may be edited after the message has been stored and a second portion that may not be edited after the message has been stored;

redundantly storing the first portion of the message at least f+1 times among individual machines, to tolerate f number of failures in a manner that allows the system to provide continuous operation; and redundantly storing the second portion of the message at least 2f+1 times among individual machines, to tolerate said f number of failures in a manner that allows the system to provide continuous operation.

11. The method of claim 10, wherein said first portion of the message that may be edited after the message has been stored is identified as a mutable portion.

12. The method of claim 11, wherein said mutable portion includes status flags for the message.

13. The method of claim 11, wherein said mutable portion is stored as metadata for the message.

14. The method of claim 11, wherein said mutable portion represents any part of the message that may be edited after the message has been stored.

15. The method of claim 10, wherein the second portion comprises an immutable portion of the message.

16. The method of claim 15, wherein said immutable portion represents any part of the message that will not be edited after the message has been stored.

17. The method of claim 15, wherein said immutable portion comprises most of the message's data.

18. The method of claim 15, wherein the message stores its message content in a message body, and wherein said immutable portion stores the message's message body.

19. The method of claim 11, further comprising:
using a pointer for identifying an immutable portion that has been stored separately from the message.

20. The method of claim 10, further comprising:
in the presence of a fault, restoring the message.

21. The method of claim 20, wherein said restoring step includes:
restoring the message by retrieving a copy of the first portion.

22. The method of claim 20, wherein said restoring step includes:
restoring the message by retrieving a copy of the second portion.

23. The method of claim 20, wherein said restoring step includes:
retrieving multiple copies of the second portion; and
based on said multiple copies, deriving a correct copy of the second portion based on a consensus of said multiple copies of the second portion.

24. The method of claim 23, wherein said deriving step includes:
subjecting said multiple copies to quorum voting for deriving the correct copy.

25. The method of claim 10, wherein said second portion is stored using large-block Input/Output (I/O).

26. The method of claim 10, wherein f equals 1, and wherein said first portion is stored twice and said second portion is stored three times.

27. The method of claim 10, wherein actual processing of the message for e-mail delivery occurs via reference.

28. The method of claim 10, wherein said second portion comprises message metadata having a size that is independent of the message's size.

29. A computer-readable medium having processor-executable instructions for performing the method of claim 10.

30. A downloadable set of processor-executable instructions for performing the method of claim 10.

31. A two-tier e-mail system comprising:
a first tier comprising a plurality of access servers for communicating with clients over the Internet via standard protocols, wherein said first tier is connected directly to the Internet;
a second tier comprising a plurality of data servers for storing e-mail messages redundantly, wherein said second tier is shielded from direct connection to the Internet so as to prevent malicious packets from reaching the data servers from the Internet wherein said data servers spread storage of replicated copies of e-mail message data across all data servers to protect against failures that cause loss of a particular data server, and wherein said access servers communicate with said data servers over a data network and manage redundant storage of objects across the data servers; and
program logic for instructing the data servers to store e-mail messages redundantly in order to provide fault-tolerant operation in a manner that allows the system to provide continuous operation, wherein, in order to tolerate f number of failures, each e-mail message is divided into an immutable portion stored at least f+1 times among selected ones of said data servers and a mutable portion stored at least 2f+1 times among selected ones of said data servers.

32. The system of claim 31, wherein said standard protocols include selected ones of POP, SMTP, and LMAP.

33. The system of claim 31, wherein said access servers include at least one network interface on the Internet.

34. The system of claim 31, wherein said data network comprises a redundant data network.

35. The system of claim 34, wherein said data network includes a Gigabit Ethernet network.

36. The system of claim 31, wherein said access servers run programs providing e-mail services to clients on the Internet.

37. The system of claim 31, further comprising a separate command server responsible for administrative tasks.

38. The system of claim 37, wherein said command server is not necessary for operation of the system.

39. The system of claim 31, wherein an immutable portion for a given e-mail message is associated with a corresponding mutable portion via a pointer.

40. The system of claim 31, further comprising:
program logic for restoring messages from redundantly-stored copies of said immutable and mutable portions.

* * * * *